United States Patent [19]

Nagate et al.

[11] Patent Number: 5,679,995
[45] Date of Patent: Oct. 21, 1997

[54] PERMANENT MAGNET ROTOR OF BRUSHLESS MOTOR

[75] Inventors: Takashi Nagate; Akiyoshi Ishiguro; Issei Yamakoshi, all of Suwa, Japan

[73] Assignee: Seiko Epson Corporation, Tokyo, Japan

[21] Appl. No.: 379,659
[22] PCT Filed: Aug. 10, 1993
[86] PCT No.: PCT/JP93/01130
§ 371 Date: Mar. 20, 1995
§ 102(e) Date: Mar. 20, 1995
[87] PCT Pub. No.: WO94/05075
PCT Pub. Date: Mar. 3, 1994

[30] Foreign Application Priority Data

| Aug. 12, 1992 | [JP] | Japan | 4-215188 |
| Sep. 8, 1992 | [JP] | Japan | 4-239694 |
| Sep. 29, 1992 | [JP] | Japan | 4-259902 |
| Dec. 18, 1992 | [JP] | Japan | 4-369047 |
| Jan. 8, 1993 | [JP] | Japan | 5-001928 |

[51] Int. Cl.$^6$ .................. H02K 21/12; H02K 15/03
[52] U.S. Cl. .................. 310/156; 310/261; 310/42; 310/187
[58] Field of Search ........................... 310/156

[56] References Cited

U.S. PATENT DOCUMENTS

| 4,922,152 | 5/1990 | Gleghorn et al. | 310/156 |
| 4,939,398 | 7/1990 | Lloyd | 310/156 |
| 4,973,872 | 11/1990 | Dohogne | 310/156 |
| 5,097,166 | 3/1992 | Mikulic | 310/156 |
| 5,159,220 | 10/1992 | Kliman | 310/156 |
| 5,369,325 | 11/1994 | Nagate et al. | 310/156 |

FOREIGN PATENT DOCUMENTS

WO92/01326  1/1992  Japan ................ 310/156

*Primary Examiner*—Steven L. Stephan
*Assistant Examiner*—Elvin G. Enad
*Attorney, Agent, or Firm*—Kanesaka & Takeuchi

[57] ABSTRACT

A brushless motor includes a stator and a rotor rotatably supported within the stator. The rotor includes a yoke which is formed by laminating many steel sheets so as to provide an even number of magnetic poles projected externally and slots provided in each of or every other said magnetic poles, a permanent magnet for a field inserted in each of said slots and having top, bottom, front, rear, and side faces, and protuberances provided on opposite sides of said slots and brought into contact with the side faces of said permanent magnet for the field, forming spaces on opposite sides of said slots.

8 Claims, 35 Drawing Sheets

ROTOR ROTATING DIRECTION

PERMANENT MAGNET ROTOR OF BRUSHLESS MOTOR

TECHNICAL FIELD

This invention relates to a permanent magnet rotor of a brushless motor, and particularly to a permanent magnet rotor of a brushless motor which has a yoke made by laminating a large number of steel sheets, an even number of magnetic poles protruding outward on the yoke, and a permanent magnet for a field inserted in each magnetic pole or every other magnetic poles.

BACKGROUND ART

Generally known brushless motors consist of a permanent magnet rotor which has a plurality of permanent magnets for a field inserted in a yoke made by laminating steel sheets and a stator which has magnetic poles opposing to the outer periphery of magnetic poles of the above permanent magnet rotor with a small space therebetween.

FIG. 35 is a sectional view in a direction intersecting at right angles with the rotatable shaft of a brushless motor using a conventional permanent magnet rotor. In this drawing, a conventional brushless motor 51 consists of a stator 52 and a permanent magnet rotor 53. The stator 52 has the permanent magnet rotor 53 rotatably supported therein and many stator magnetic poles 54 protruded inward. The stator magnetic poles 54 have a coil (not shown) wound thereon. Passing a current through the coil excites a prescribed magnetic pole of the stator magnetic poles 54. A magnetic pole face 55 at the end of the stator magnetic poles 54 is positioned above a cylindrical face at an equal distance from the center of a rotatable shaft 56 of the motor.

The permanent magnet rotor 53 consists of a yoke 57 made by laminating many steel sheets and a pair of permanent magnets 58 for a field. The yoke 57 has four magnetic poles 59 protruded externally on its outer periphery, and the permanent magnets 58 for the field are inserted in every other bases of the magnetic poles 59 with N poles opposed to each other. A magnetic pole face 60 at the end of each magnetic pole 59 is formed to have a curved shape at an equal distance from the center of the rotatable shaft 56, and opposed to the magnetic pole face 55 at an equal distance at every point on the face of the rotatable magnetic pole face 60.

In the above permanent magnet rotor 53, the repulsion of the N poles of the permanent magnets 58 for the field causes the magnetic fluxes to get out of the magnetic pole faces 60 without the permanent magnet for the field as shown in the drawing, to pass through the stator, and to enter the yoke 57 from the magnetic pole faces 60 with the permanent magnet for the field. Accordingly, the magnetic poles having the permanent magnet of the permanent magnet rotor 53 become S pole, and those not having the permanent magnet of the permanent magnet rotor 53 become N pole.

As shown in the drawing, the permanent magnet rotor 53 is rotated by exciting the stator magnetic poles 54, which have been slightly deviated in the rotating direction from the center of the magnetic poles 59 of the permanent magnet rotor 53, to N pole. The permanent magnet rotor 53 is rotated by being attracted to the excited stator magnetic poles 54. Then, the stator magnetic poles 54 which are further displaced with respect to the rotated permanent magnet rotor 53 are excited to N pole. The permanent magnet rotor 53 is further rotated by being attracted to the newly excited stator magnetic poles 54. This procedure is repeated to continuously rotate the permanent magnet rotor 53.

The known conventional brushless motor uses a back electromotive force generated by the rotation of the permanent magnet rotor 53 to determine the position of the above permanent magnet rotor. Specifically, the rotation of the permanent magnet rotor 53 causes the magnetic fluxes of the permanent magnets 58 for the field to cross the coils (not shown) wound on the magnetic pole faces 55 of the stator 52 to generate the back electromotive force in the coils of the stator 52. The position of the back electromotive force is detected to detect the position of each permanent magnet for a field of the permanent magnet rotor 53, and the position of the magnetic poles to be excited on the stator side is determined and excited.

FIG. 36 shows a conventional permanent magnet rotor in an exploded state. A conventional permanent magnet rotor 53 has a yoke 57 and permanent magnets 58 for a field. The yoke 57 is formed by laminating a large number of steel sheets 61. The yoke 57 has magnetic poles 57 formed on the outer periphery, and at the bases of the magnetic poles 59, slots 62 are respectively formed to insert the permanent magnets 58 for the field. Furthermore, each steel sheet 61 is pressed to form caulking sections 63 recessed in the form of a rectangle. The steel sheets 61 are integrally laminated by mutually press-fitting the caulking sections 63.

The permanent magnets 58 for the field are formed to a size capable of being housed in the slots 62. In assembling the permanent magnet rotor 53, an adhesive is applied to the surfaces of the permanent magnets 58 for the field, which are then inserted in the slots 62 with their same magnetic poles opposed to each other as shown in the drawing. Arrows Q in the drawing indicate the directions that the permanent magnets 58 for the field are inserted.

On the other hand, for the permanent magnet rotor 53 which cannot use an adhesive because of its application conditions, the permanent magnets 58 for the field are formed so as to be fitted in the slots 62 without leaving any gap. To assemble the permanent magnet rotor 53, the permanent magnets 58 for the field are pushed in the directions Q shown in the drawing by a pneumatic device so as to be forced into the slots 62. Therefore, a force is applied, in centrifugal directions R, to bridges 64 connecting the leading end of the magnetic pole and the base of the magnetic pole at both ends of the slot.

FIG. 37 shows a permanent magnet rotor in an exploded state developed by the present applicant. It is shown that engagement pawls 62a are formed to protrude to engage with a permanent magnet 58 for a field on the inner periphery of slots 62 for inserting the permanent magnet for the field. The permanent magnet 58 for the field can be inserted in the slots 62, and has a sectional shape to engage with the engagement pawls 62a.

With the above permanent magnet rotor, the permanent magnet 58 for the field is engaged with the engagement pawls 62a only and its frictional resistance is small, allowing to press-fit the permanent magnet 58 for the field into the yoke 57 by a small pressing force. And, when the permanent magnet 58 for the field is press-fitted into the yoke 57, the engagement pawls 62a can hold the permanent magnet 58 for the field to prevent it from coming out.

In the above prior arts, the permanent magnet rotors which apply an adhesive to the outer periphery of the permanent magnets for the field before inserting in the slots of the yoke have disadvantages that the adhesive is dissolved with a refrigerant or pressurizing fluid and the permanent magnets for the field come out.

On the other hand, in the conventional permanent magnet rotor which directly forces the permanent magnets for the field into the slots of the yoke without using an adhesive, a large force is used to press-fit the permanent magnets for the field, and this force sometimes breaks the permanent magnets for the field, or an inserting force is applied to the bridges in the centrifugal directions, possibly resulting in their breakage. And, the above permanent magnet rotor is required to have a high processing precision for fitting the permanent magnets for the field in the slots of the yoke in view of a dimensional tolerance, making it difficult to produce the permanent magnet rotor. Besides, the intimate contact of the permanent magnets for the field with the bridges at both ends of the slots causes the magnetic fluxes of the permanent magnets for the field to leak at the bridges and prevent them from passing the outside space of the magnetic poles, resulting in no cross of the magnetic fluxes with the stator of a motor. Therefore, the magnetic fluxes do not produce a force for rotating the permanent magnet rotor. And, the leakage of the magnetic fluxes at the bridges generates heat due to a core loss.

In view of the above, an object of this invention is to provide a permanent magnet rotor which prevents the permanent magnets for the field from being come out due to a refrigerant or pressurizing fluid, makes positioning of the permanent magnets for the field, can be produced easily, and has high performance.

And, the permanent magnet rotor (see FIG. 37) invented by the applicant has an advantage that a force for press-fitting the permanent magnets for the field is reduced extensively. But, the engagement pawls of each steel sheet are gradually bent in the press-fitting direction when the permanent magnet for the field is press-fitted, this bending of the engagement pawls is accumulated to heavily bend the engagement pawls at the end in the laminating direction of the yoke, and this bending exceeds a binding force of the caulking sections of the steel sheets to partly separate the steel sheets. Besides, in a conventional permanent magnet rotor, because of different tolerances of the permanent magnet for the field and the yoke length in the axial direction, the leading end of the permanent magnet for the field does not completely engage with the engagement pawls of the steel sheets at the end of the yoke when the permanent magnet for the field is shorter than the yoke, resulting in an unstable press-fitted state and sometimes separating the steel sheets due to vibration or the like.

Accordingly, another object of this invention is to remedy the unsolved problems of the permanent magnet rotor invented by the present applicant and to provide a permanent magnet rotor of a brushless motor in which the permanent magnet for the field can be inserted by a small pressing force and prevented from coming out, and the steel sheets at the end of the yoke are not separated when press-fitting the permanent magnet for the field and using, and to provide a method for producing it.

Furthermore, in the above permanent magnet rotor (see FIG. 37) invented by the applicant, part of the magnetic fluxes of the permanent magnet for the field getting out from the N poles passes through the bridges of the yoke to reach the P poles of the permanent magnet for the field. The magnetic fluxes passing through the bridges do not cross the stator of a motor and do not contribute to rotate the permanent magnet rotor. Therefore, the efficiency of the magnetic force of the permanent magnets for the field is lowered in inverse proportion to the magnetic fluxes of the permanent magnets for the field passing through the bridges.

On the other hand, the reduction of the sectional areas of the bridges of the yoke can reduce the number of magnetic fluxes passing through the bridges. This is because the number of magnetic fluxes passing through the bridges is determined from the product of a flux density determined according to the yoke material by a sectional area of the bridges.

But, in the yoke formed by laminating the steel sheets, the steel sheets forming the yoke are generally formed by a punch-out process, but it is quite difficult to punch out the steel sheets for the yoke having the bridges with a very small sectional area. Besides, in the yoke having the bridges with a very small sectional area, the bridges of the yoke are required to have a high mechanical strength because the magnetic poles and the permanent magnets for the field suffer from a centrifugal breakage due to the centrifugal force when the yoke is rotated at a high speed. And when the bridges have a high mechanical strength, there is a disadvantage that the utilization efficiency of the permanent magnets for the field is lowered.

In view of the above, another object of this invention is, in a permanent magnet rotor of a brushless motor having permanent magnets for a field, to provide a permanent magnet rotor which forms a yoke by a plurality of steel sheets laminated, and has an optimum bridge width of the yoke among a width which can be punched out, a width allowable in view of the number of passing magnetic fluxes, and a width allowable in view of a mechanical strength by a centrifugal force.

Besides, in a conventional permanent magnet rotor, the magnetic fluxes of the permanent magnets for the field are concentrated on a position deviated in the rotating direction from the circumferential center of the magnetic poles due to the relation between the bridge width and the width in a radial direction at the magnetic poles, or the relative positional relation of the permanent magnet rotor and the stator of the brushless motor, the back electromotive force generated by the magnetic fluxes is detected earlier than the actual position of the permanent magnets for the field, the magnetic poles of the stator are excited earlier than a prescribed timing, and the permanent magnet rotor has a failure in its rotation.

In view of the above, another object of the invention is to provide a permanent magnet rotor which is formed to concentrate the magnetic fluxes of a magnet for a field to a prescribed position of a magnetic pole and can accurately detect the position of the magnetic pole.

SUMMARY OF THE INVENTION

In a brushless motor comprising a stator and a rotor rotatably supported within the stator, wherein the rotor has a yoke which is formed by laminating many steel sheets, the yoke has an even number of magnetic poles protruded externally, and a permanent magnet for a field is inserted in each magnetic pole or every other magnetic poles, this invention is to provide a permanent magnet rotor characterized by that the above permanent magnet for the field is inserted in slots formed on the magnetic poles, and the slots are provided with protrusions at both ends to come in contact with the side faces of the permanent magnet for the field.

And, in a brushless motor comprising a stator and a rotor rotatably supported within the stator, wherein the rotor has a yoke which is formed by laminating many steel sheets, the yoke has an even number of magnetic poles protruded externally, and a permanent magnet for a field is inserted in each magnetic pole or every other magnetic poles, this invention is to provide a permanent magnet rotor characterized by that the above permanent magnet for the field is inserted in slots formed on the magnetic poles, the slots have engagement pawls disposed to protrude so as to engage with the permanent magnet for the field, and among the laminated steel sheets of the yoke, those corresponding to the engagement pawls have reliefs for absorbing a bend of the engagement pawls.

And, in a brushless motor comprising a stator and a rotor rotatably supported within the stator, wherein the rotor has a yoke which is formed by laminating many steel sheets, the yoke has an even number of magnetic poles protruded externally, and a permanent magnet for a field is inserted in each magnetic pole or every other magnetic poles, this invention is to provide a permanent magnet rotor characterized by that at least one end of the yoke has a steel sheet deviated in a rotating direction.

And, in a brushless motor comprising a stator and a rotor rotatably supported within the stator, wherein the rotor has a yoke which is formed by laminating many steel sheets, the yoke has an even number of magnetic poles protruded externally, and a permanent magnet for a field is inserted in each magnetic pole or every other magnetic poles, this invention is characterized by that the above permanent magnet for the field is inserted in slots formed on the magnetic poles, and a bridge width at either end of the slots is determined, among a width which can be punched out, a width allowable in view of the number of passing magnetic fluxes, and a width allowable in view of a mechanical strength by a centrifugal force, to be a larger one between the width which can be punched out and the width allowable in view of the mechanical strength by the centrifugal force.

And, in a brushless motor comprising a stator and a rotor rotatably supported within the stator, wherein the rotor has a yoke which is formed by laminating many steel sheets, the yoke has an even number of magnetic poles protruded externally, and a permanent magnet for a field is inserted in each magnetic pole or every other magnetic poles, this invention is to provide a permanent magnet rotor characterized by that each magnetic pole has at least one connecting portion or gap for laminating the steel sheets.

And, in a brushless motor comprising a stator and a rotor rotatably supported within the stator, wherein the rotor has a yoke which is formed by laminating many steel sheets, the yoke has an even number of magnetic poles protruded externally, and a permanent magnet for a field is inserted in each magnetic pole or every other magnetic poles, this invention is to provide a permanent magnet rotor characterized by that the above permanent magnet for the field is inserted in slots formed on the magnetic poles, and a bridge width at either end of the slots is disposed to be smaller than a width between the outside of the permanent magnet for the field and the outside edge of the magnetic pole.

And, in a brushless motor comprising a stator and a rotor rotatably supported within the stator, wherein the rotor has a yoke which is formed by laminating many steel sheets, the yoke has an even number of magnetic poles protruded externally, and a permanent magnet for a field is inserted in each magnetic pole or every other magnetic poles, this invention is to provide a permanent magnet rotor characterized by that a width of the magnetic pole in a radial direction is about 1.5 times of a pole width of the stator.

Furthermore, in a brushless motor comprising a stator and a rotor rotatably supported within the stator, wherein the rotor has a yoke which is formed by laminating many steel sheets, the yoke has an even number of magnetic poles protruded externally, and a permanent magnet for a field is inserted in each magnetic pole or every other magnetic poles, this invention is to provide a permanent magnet rotor characterized by that the front or back of the outer periphery and in a rotating direction of the magnetic pole is notched to a certain shape.

BEST MODE FOR CARRYING OUT THE INVENTION

Figure 1:
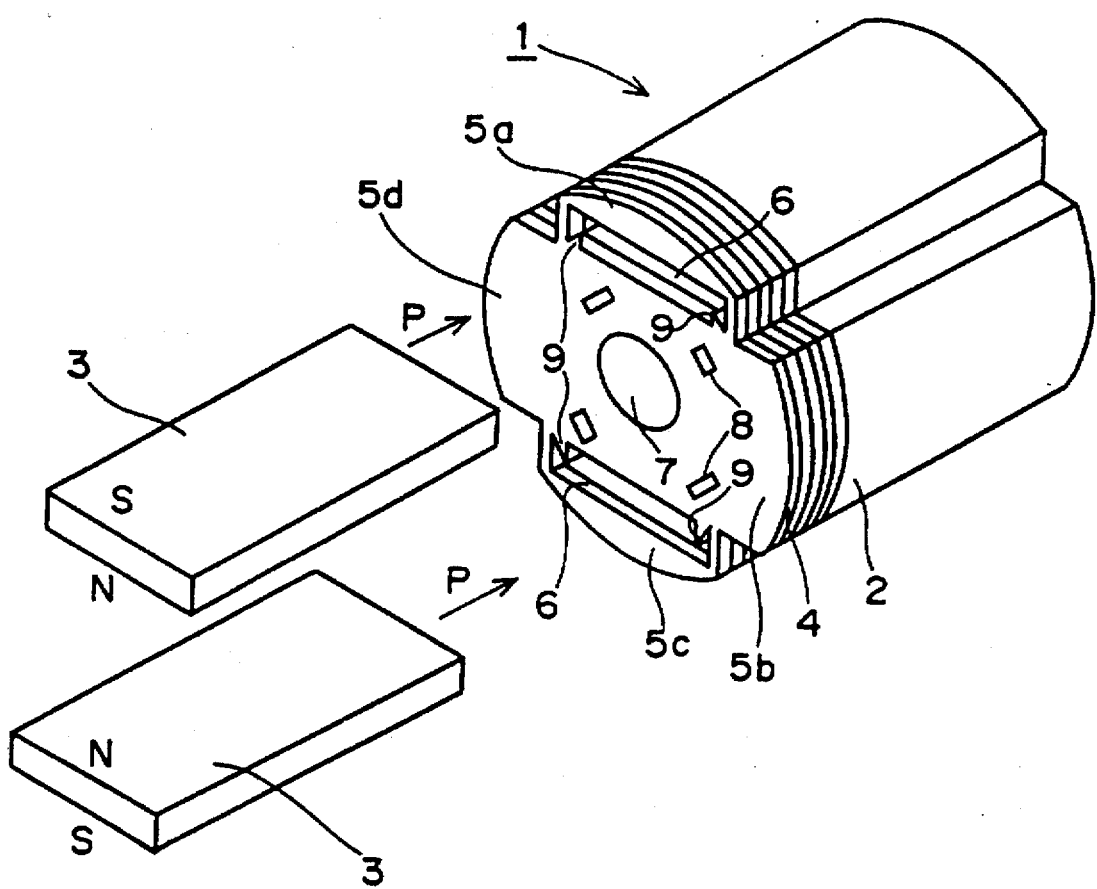
FIG. 1 is a perspective view showing the permanent magnet rotor in an exploded state of this invention.

FIG. 1 shows the permanent magnet rotor in an exploded state of this invention. A permanent magnet rotor 1 has a column yoke 2 and a pair of plate permanent magnets 3, 3 for a field. The yoke 2 is formed by laminating a large number of steel sheets 4, 4 into one body. The yoke 2 has four magnetic poles 5 (5a, 5b, 5c and 5d) protruding outward radially formed on the outer periphery. Among these magnetic poles, the two magnetic poles 5a, 5c opposing to each other have at their bases a pair of slots 6, 6 for inserting the permanent magnet 3 for the field. Furthermore, at the center of the yoke 2, a hole 7 is formed to pass a rotatable shaft (not shown) through it. The steel sheet 4 has its part recessed to form caulking sections 8, 8, and the caulking sections 8 are mutually press-fitted to laminate into one body.

The steel sheet 4 forming the slots 6, 6 has at both ends of the slots formed a plurality of protuberances 9, 9 in the shape of a triangle.

The permanent magnets 3, 3 for the field are formed into a hexahedron having a rectangular cross section, and respectively inserted into the slots 6, 6 in the directions P shown in the drawing so that the faces having the magnetism of N pole are faced to the hole 7.

Figure 2:
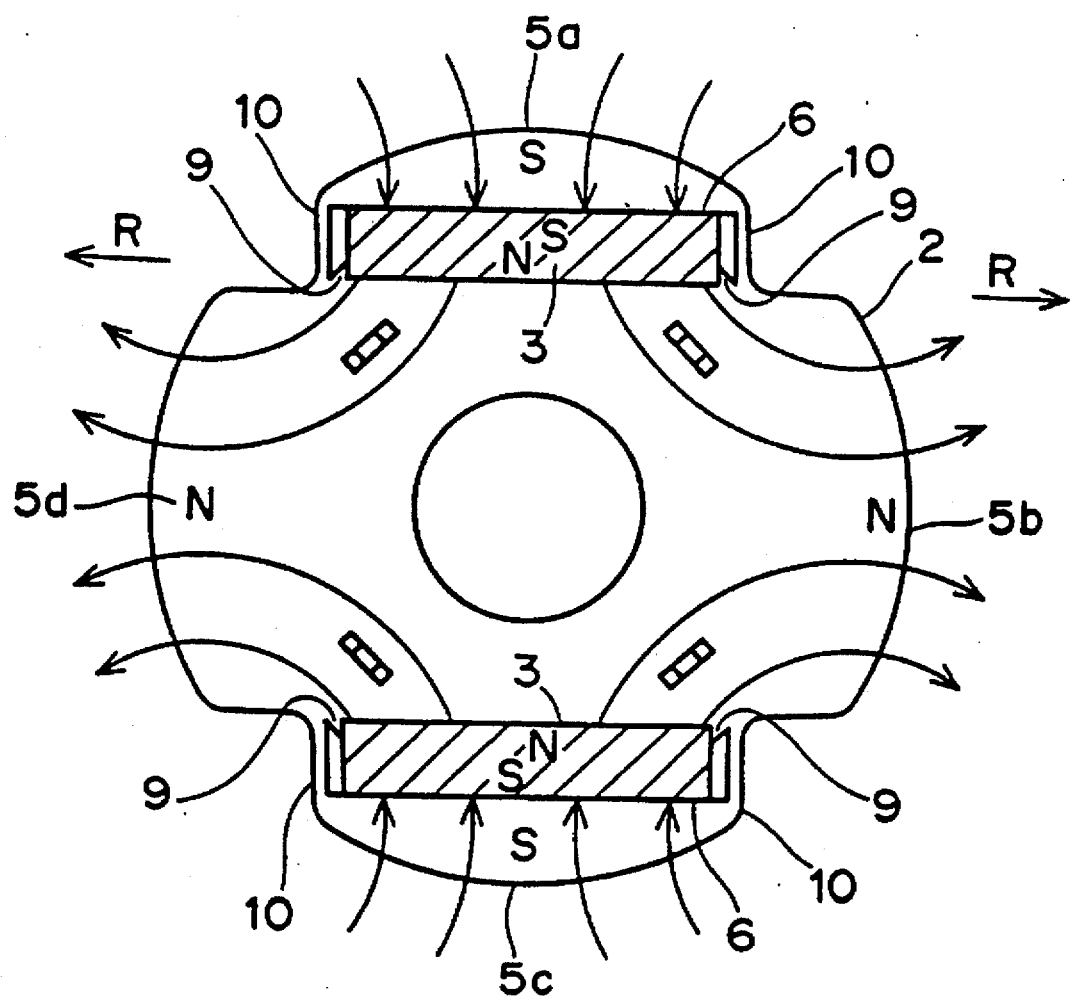
FIG. 2 is a sectional view showing the permanent magnet rotor of this invention.

FIG. 2 is a sectional view of a permanent magnet rotor, showing a cross section in a direction intersecting at right angles to the rotatable shaft of the yoke 2. The slots 6, 6 are bases of the magnetic poles 5a, 5c of the yoke 2 and disposed at substantially equal distance from the rotatable shaft. The permanent magnets 3, 3 for the field are disposed with their faces having the magnetism of N pole opposed to each other, and the magnetic fluxes get out of the magnetic poles 5a, 5c of the yoke 2 by the repulsion of the magnetic poles and reach the magnetic poles 5b, 5d as shown in the drawing. As a result, the magnetic poles 5a, 5c show the magnetism of S pole, and the magnetic poles 5b, 5d show the magnetism of N pole. Thus, the outer periphery of the yoke 2 has four magnetic poles which have N and S poles alternately.

Furthermore, either end of the slot 6 has a bridge 10 to connect the base and the leading end of the magnetic pole 5, and there is a space between the bridge 10 and the permanent magnets 3, 3 for the field, so that the magnetic fluxes from the N pole side of the permanent magnets for the field pass through the bridges 10 to reach the S pole side of the permanent magnets for the field, but the magnetic fluxes passing through the bridges 10 are reduced because of a large distance from the permanent magnets for the field.

As shown in the drawing, the permanent magnets 3, 3 for the field have their surfaces partly engaged with one side of the protuberances 9 when press-fitted, and the protuberances 9 suffer from deflection or plastic deformation in the outward directions R due to a dimensional difference of the magnets and are held within the slots 6, 6. The protuberances 9 prevent the permanent magnets 3, 3 for the field from contacting to the bridges 10 and the inner periphery of the slots 6, 6 on the side of the rotatable shaft. Therefore, the friction due to the contact between the permanent magnets 3, 3 for the field and the slots 6, 6 is small, and the permanent magnets for the field can be inserted by a small force and positioned. As shown in the drawing, when press-fitted, the outer periphery of the permanent magnets 3, 3 for the field engages with one side of the protuberances 9 to prevent the permanent magnets 3, 3 for the field from coming out, and no extra force is applied to the bridges 10. Since the permanent magnet rotor of this invention does not use an adhesive to hold the permanent magnets 3, 3 for the field in the slots 6, 6, the permanent magnets 3, 3 for the field can be prevented from coming out even when the permanent magnet rotor is used in a refrigerant or pressurizing fluid because the adhesive does not dissolve in the refrigerant or pressurizing fluid. Besides, the permanent magnets for the field can be fixed regardless of the processing precision of the permanent magnets for the field.

Figure 3:
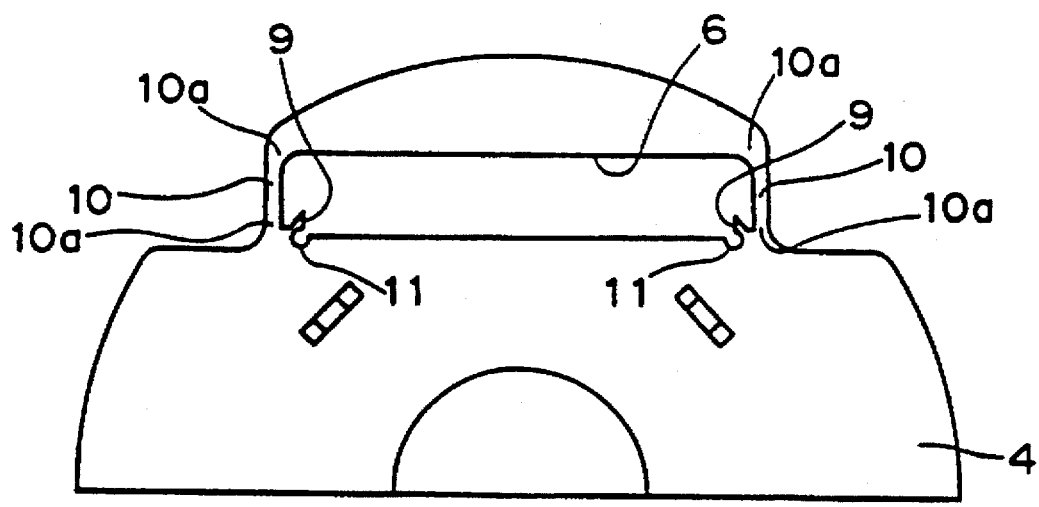
FIG. 3 is a sectional view of an essential part showing another embodiment of this invention.

FIG. 3 shows the yoke of another embodiment of the permanent magnet rotor of this invention.

In this embodiment, protuberances 9 of the steel sheet 4 has a horn shape to engage with the permanent magnet for the field (not shown) and a notch 11 disposed on one side of the bottom of the horn shape of the protuberances 9. The protuberances 9 are connected to the inner edge of the steel sheet 4 forming the slot 6 via the notch 11. To engage with the permanent magnet for the field, the protuberances 9 must be inclined to a prescribed level. When the protuberances 9 are excessively large, the magnetic flux of the permanent magnet for the field leaks at the protuberances 9, resulting in increasing the leaked magnetic fluxes. And, when the protuberances 9 are not inclined to the prescribed level, the protuberances 9 are deformed by press-fitting the permanent magnet for the field. Positioning of the notch 11 on the side of the permanent magnet for the field of the protuberances 9 secures an appropriate inclination of the protuberances 9, its appropriate deflection reduces a force for inserting the permanent magnet for the field and eliminates the necessity of chamfering the horn part of the permanent magnet for the field required in press-fitting the permanent magnet for the field. In other words, the permanent magnet for the field can be inserted in the slots easily. Furthermore, either side of the slot has the bridge 10 to connect the base and the leading end of the magnetic pole, and there is a space between the bridge 10 and the permanent magnets for the field, so that a base 10a of the bridge 10 can be made thick, resulting in increasing a strength of the bridge 10, and in the production, breakage of the bridge 10 is reduced as much as possible. In addition, the space provided reduces the leaked magnetic fluxes of the bridge 10 due to the permanent magnets for the field and the heat generation due to the core loss at the bridge 10 can be reduced because the base 10a has a large area.

The above protuberances 9 engaging with the permanent magnets for the field have been described with reference to the shape of a horn, but the shape is not limited to it, and may be formed into a round shape.

Figure 4:
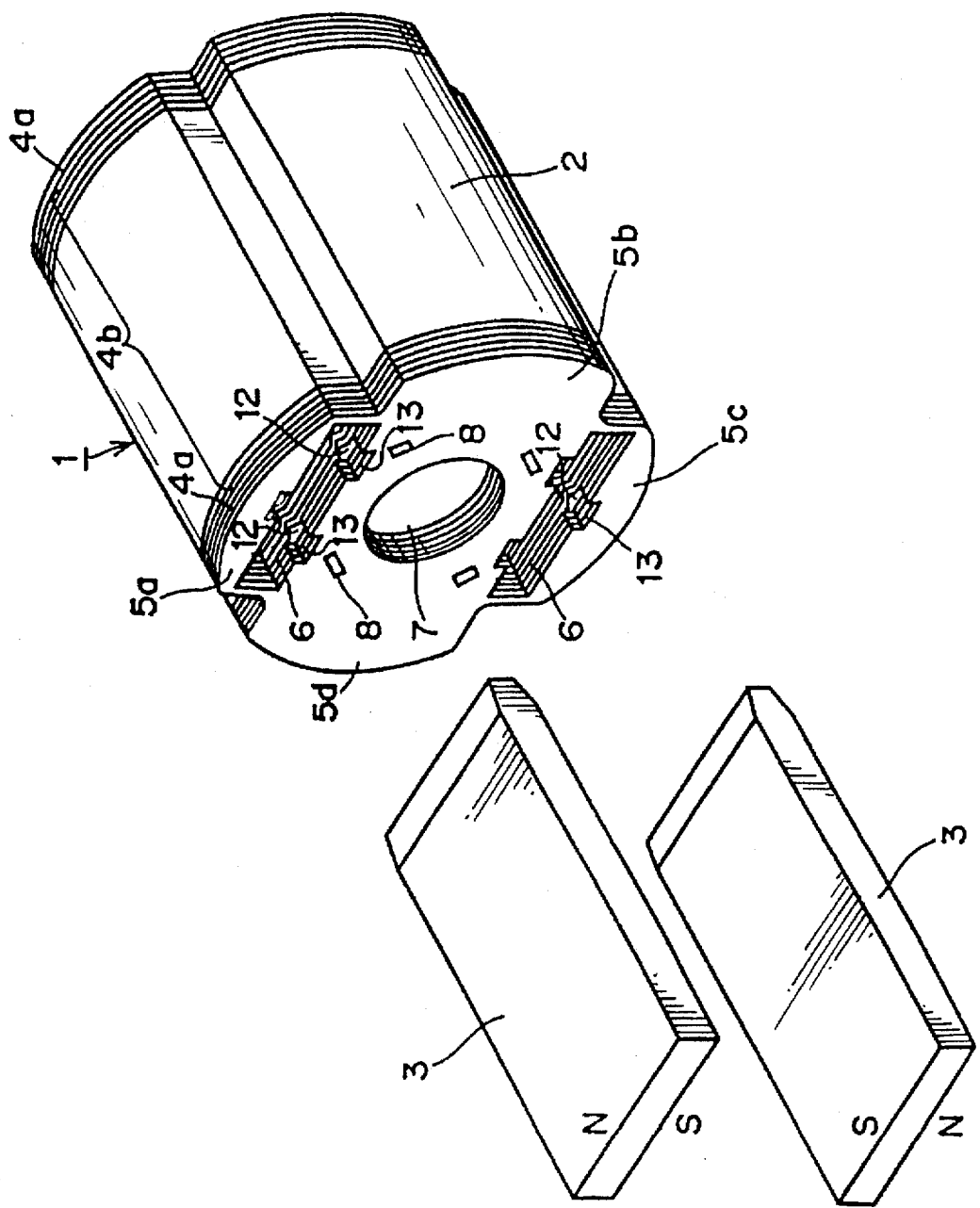
FIG. 4 is a perspective view showing the permanent magnet rotor in an exploded state of another embodiment of this invention.

FIG. 4 shows the permanent magnet rotor 1 of a second embodiment in an exploded state. In the same way as in the first embodiment, the yoke 2 is formed by laminating a large number of steel sheets 4 (4a, 4b) so as to match one another. The steel sheets 4b at the middle in the laminated direction of the yoke 2 have engagement pawls 12 disposed to protrude from the inner periphery of the slots 6 so as to engage with the permanent magnet 3 for the field. On the other hand, the several number of the steel sheets 4a at either end in the laminated direction of the yoke 2 have reliefs 13 disposed to absorb a bend of the engagement pawls 12 on the inner periphery of the slots 6 corresponding to the engagement pawls 12 of the steel sheets 4b at the middle.

Figure 5:
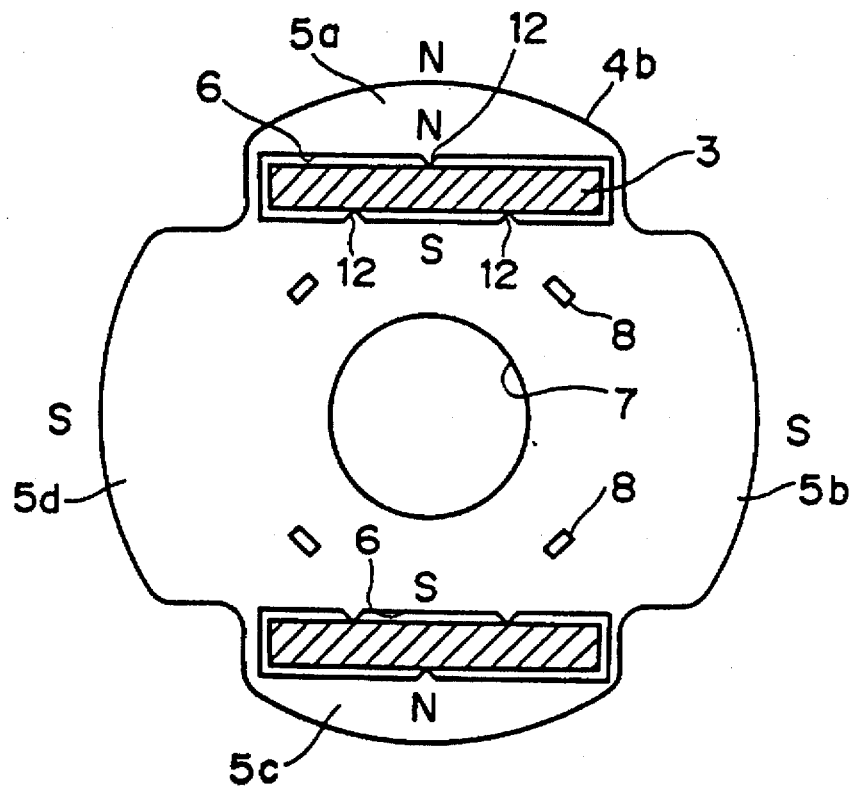
FIG. 5 is a sectional view of the center in the laminated direction of the permanent magnet rotor of this invention.

FIG. 5 shows a sectional view at the middle of the yoke 2 having the permanent magnets 3 for the field inserted. In the steel sheets 4b at the middle in the laminated direction of the yoke 2, the engagement pawls 12 engage with the permanent magnets 3 for the field to reduce a press-fitting resistance of the permanent magnets 3 for the field and prevent them from coming out.

Figure 6:
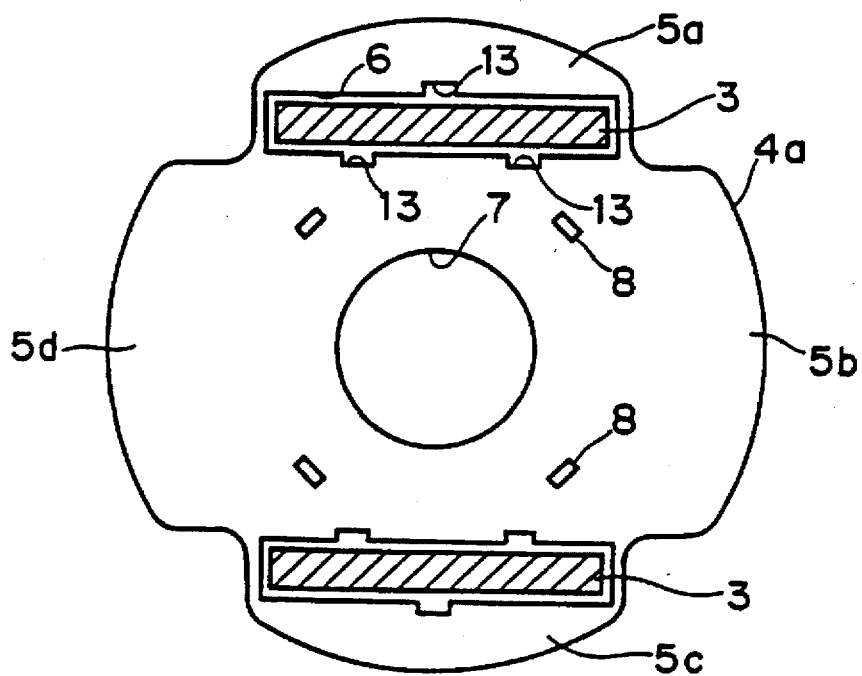
FIG. 6 is a sectional view of the end in the laminated direction of the permanent magnet rotor of this invention.

FIG. 6 shows a sectional view of the end portion in the press-fitting direction of the yoke 2 having the permanent magnets 3 for the field inserted. The leading end of the permanent magnet 3 for the field which is first press-fitted has the inclined faces to reduce its sectional area, and the steel sheets 4a at the ends of the yoke 2 in the press-fitting direction have only the reliefs 13 on the inner periphery of the slot 6, so that the leading end of the permanent magnet for the field is not in contact with the inner periphery of the slot 6 of the steel sheets 4a as shown in FIG. 6.

The operation of the permanent magnet rotor of the second embodiment will be described based on the above structure with reference to FIG. 7.

Figure 7:
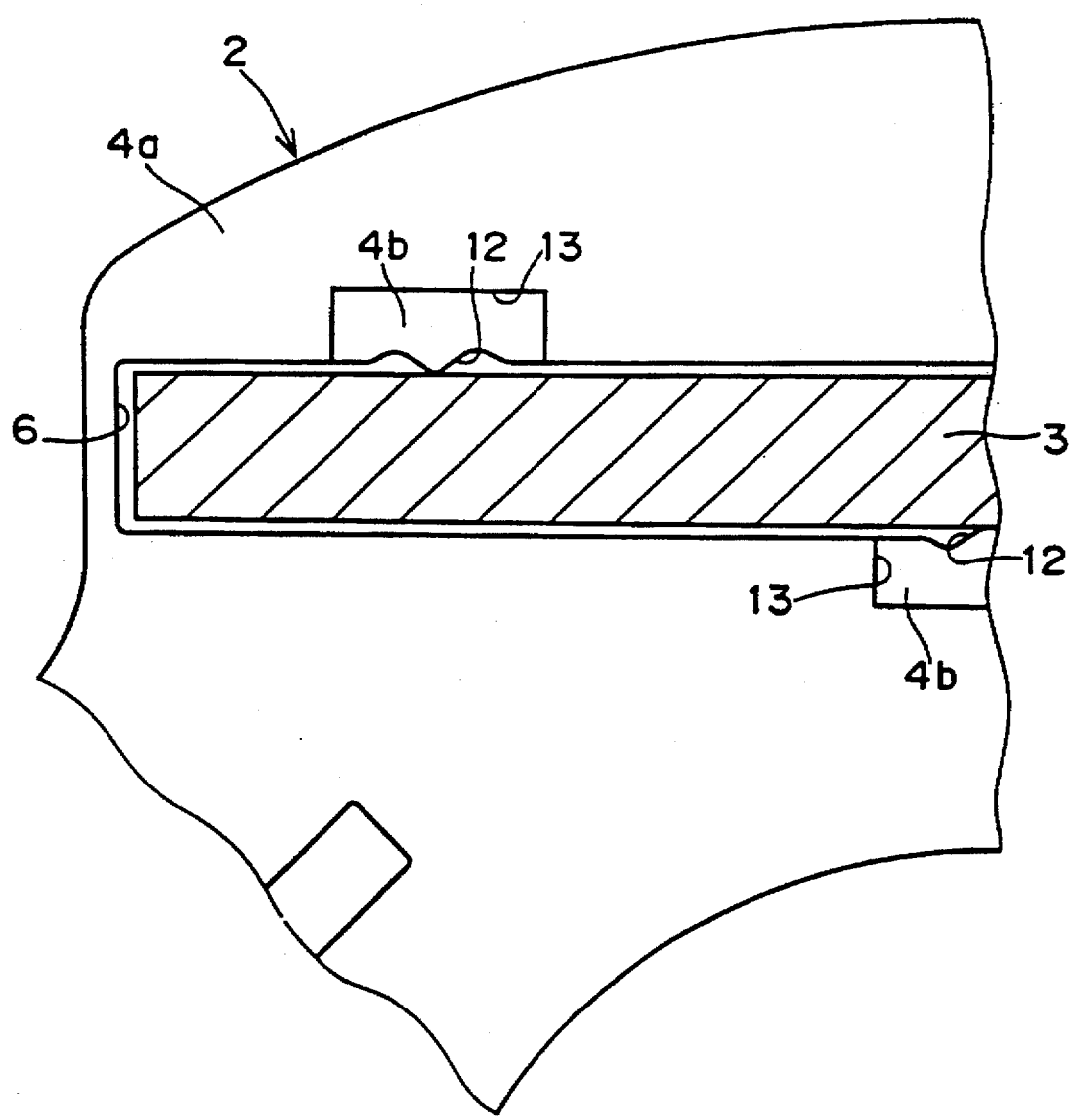
FIG. 7 is a sectional view showing the permanent magnet rotor in a partly enlarged state of this invention.

FIG. 7 shows the yoke 2 with its part expanded, illustrating the laminated state of the steel sheets 4b at the middle part and the steel sheet 4a at the end in the laminated direction, and the engaged state of the steel sheets 4a, 4b and the permanent magnet 3 for the field.

FIG. 7 shows that the permanent magnet 3 for the field is slightly engaged with the engagement pawls 12 of the steel sheets 4b at the middle of the yoke 2, so that the permanent magnet 3 for the field can be press-fitted in the yoke 2 by a small pressing force with a small frictional resistance at the leading end of the engagement pawls 12. It is experimentally known that when the permanent magnet for the field is being press-fitted, the engagement pawls 12 of each steel sheet 4b is gradually bent in the press-fitting direction due to the engagement and friction with the permanent magnet 3 for the field, and the bends of the engagement pawls 12 are accumulated to be great at the end of the yoke 2. As shown in FIG. 7, the steel sheet 4a at the end in the laminated direction of the yoke 2 of this embodiment has the reliefs 13 positionally matching the engagement pawls 12 formed on the inner periphery of the slot 6 to absorb the bends of the engagement pawls 12, resulting in preventing the steel sheet 4a from separating. And, by inserting the permanent magnet 3 for the field, the engagement pawls 12 and the permanent magnet 3 for the field are mutually engaged, enabling to prevent the permanent magnet 3 for the field from coming out.

According to this embodiment, the steel sheets 4a having the reliefs 13 are laminated at the ends of the yoke 2 to make the permanent magnet 3 for the field always longer than those having the engagement pawls 12 of the yoke 2, so that all engagement pawls 12 are completely engaged with the permanent magnet 3 for the field to provide a stable press-fitted state. Thus, the disadvantages of a conventional permanent magnet rotor in which some engagement pawls at the ends of the yoke do not engage with the permanent magnet for the field, falling in an unstable press-fitted state and causing the separation of the steel sheets by vibration or the like can be remedied.

A method for easily producing the permanent magnet rotor of this embodiment will be described with reference to FIG. 8 and FIG. 9.

Figure 8:
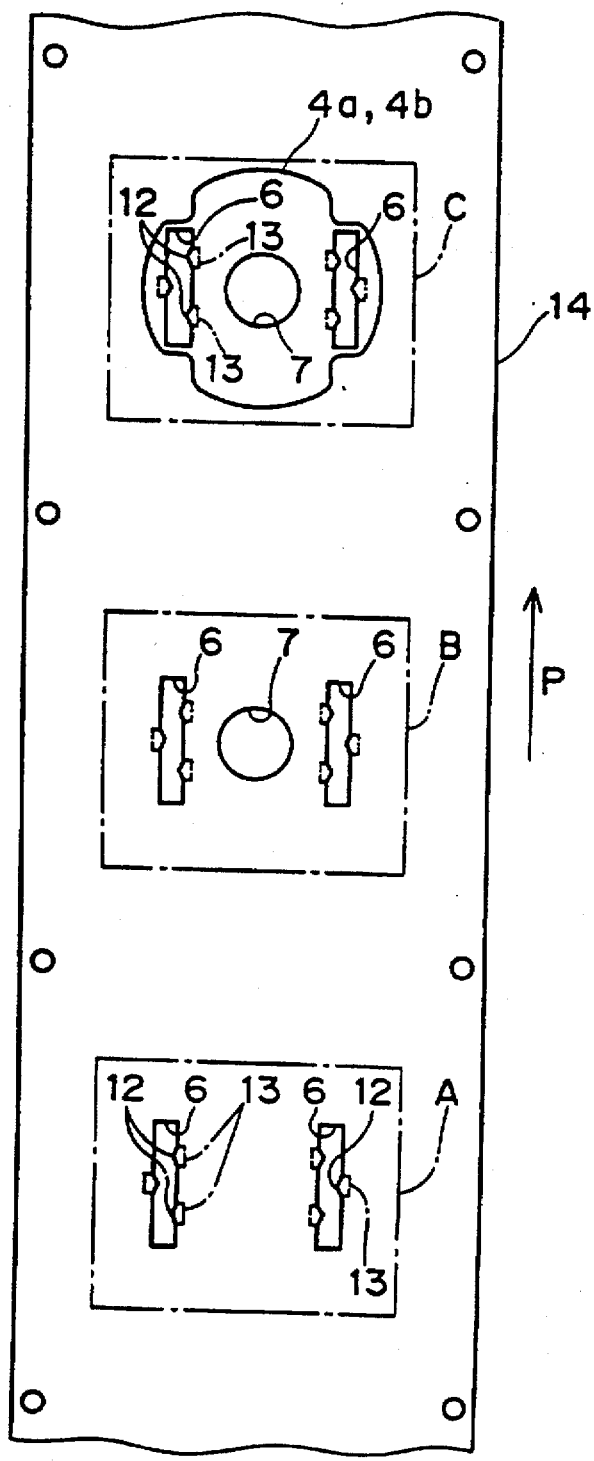
FIG. 8 is a view showing the process for punching out a steel sheet for the permanent magnet rotor of this invention.

FIG. 8 shows one process for punching out the steel sheets to be laminated to form the yoke from a belt steel sheet. As shown in FIG. 8, the steel sheets 4a, 4b of this embodiment are punched out by sending a belt steel sheet material 14 through a punch die in the direction P at a prescribed pitch. Punch-out position A punches out the slots 6 having the engagement pawls 12 or the slots 6 having the reliefs 13, punch-out position B punches out the rotatable shaft hole 7, and punch-out position C punches out an outward form of the steel sheet 4a or 4b to be laminated and laminates at the same time. The steel sheet punch-out process of this embodiment uses a punch die which punches out the slots 6 with different shapes according to a driving depth.

Figure 9:
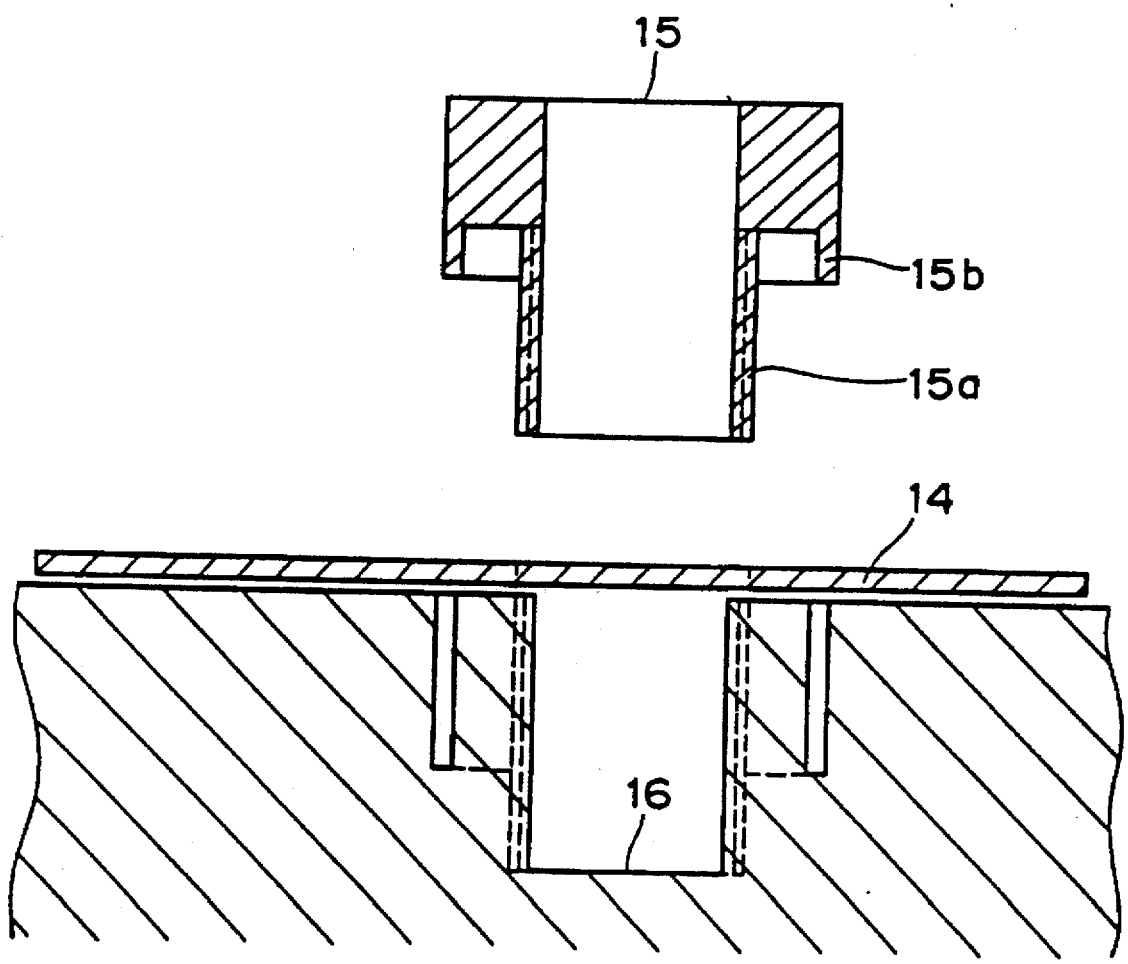
FIG. 9 is a sectional view showing a punch die used in this invention.

FIG. 9 shows the punch die which punches out the slots with different shapes according to a driving depth. The punch die consists of a male mold 15 and a female mold 16, the male mold 15 of the punch die is supported to be vertically movable above the steel sheet material 14, and the female mold 16 of the punch die is fixed below the steel sheet material 14. After the steel sheet material 14 is sent at a prescribed pitch and stopped at a prescribed position, the male mold 15 of the punch die is brought down to punch out through the steel sheet material 14 and to enter the female mold 16 of the punch die. Thus, the steel sheet material 14 is punched out into the shape of the male mold 15 of the punch die.

As shown in FIG. 9, the male mold 15 of the punch die of this embodiment has different-shaped bottom and top ends, a lower part 15a has a shape to punch out the slots 6 and the engagement pawls 12, and an upper part 15b which is above the part 15a has a shape to punch out the reliefs 13. Thus, when a driving depth is in a range to the part 15a, the slots 6 having the engagement pawls 12 can be punched out and, when the driving depth reaches the part 15b, the slots 6 having the reliefs 13 can be punched out.

The production method of this embodiment first punches out a prescribed number of the steel sheets 4a for one end of the yoke 2 at a driving depth in a range using the part 15b and laminates them, punches out the steel sheets 4b for the middle of the yoke 2 at a driving depth in a range using the part 15a and laminates them, and punches out a prescribed number of the steel sheets 4a for the other end of the yoke 2 at a driving depth in a range using the part 15b and laminates them to complete the production of the yoke 2.

According to the above production method, the yoke 2 which has the steel sheets 4a having the reliefs 13 at the ends and the yoke 2 which has the steel sheets 4b having the engagement pawls 12 at the middle can be continuously produced by the same production device, the production device can be simplified, and work efficiency can be improved extensively.

But, it is obvious that this invention is not limited to the above but can also be applied to a permanent magnet rotor in which the permanent magnets for the field are inserted into the yoke formed of the steel sheets having a prescribed shape.

In the above description about the production method, three punch dies are used to successively punch out one steel sheet, but it is to be understood that one punch die may be used to punch out steel sheets with different shapes in the driving depth.

As described above, the yoke of the permanent magnet rotor according to the second embodiment disposes the steel sheets having the engagement pawls for reducing a resistance at press-fitting of the permanent magnets for the field and preventing them from coming out at the middle in the laminated direction, and disposes the steel sheets having the reliefs to absorb the bend of the engagement pawls at press-fitting of the permanent magnets for the field at the ends in the laminated direction, to allow the press-fitting of the permanent magnets for the field by a small pressing force. And, the steel sheets at the ends of the yoke are not separated by the press-fitting, and after the insertion, the permanent magnets for the field are prevented from coming out. And, the permanent magnet rotor of this embodiment can easily set the permanent magnets for the field to be longer than the part having the engagement pawls of the yoke, so that all engagement pawls engage with the permanent magnets for the field to provide a stable press-fitted state, and the possibility of the steel sheets from being separated by vibration can be reduced.

And, the method for producing the permanent magnet rotor of this embodiment has the punch die which can punch out the steel sheets with different shapes according to a driving depth, and can vary only the driving depth to continuously produce the yoke having the steel sheets having the reliefs at the ends and the steel sheets having the engagement pawls at the middle by the same production device, so that the production device can be simplified, and the work efficiency can be improved extensively.

Figure 10:
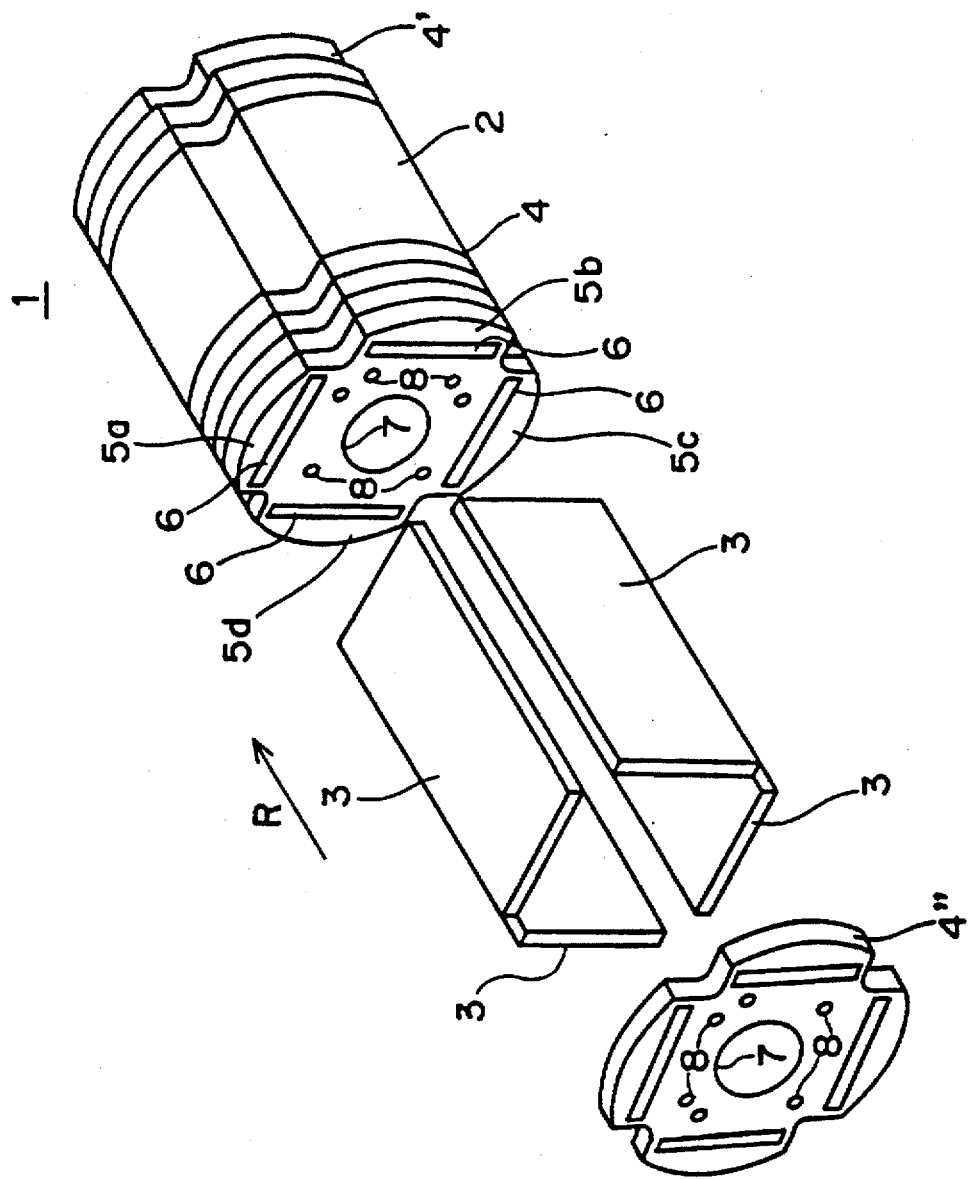
FIG. 10 is a perspective view showing the permanent magnet rotor in an exploded state of this invention.

FIG. 10 shows the permanent magnet rotor in an exploded state of a third embodiment. A permanent magnet rotor 1 has two pairs of plate permanent magnets 3, 3 in this case. The yoke 2 is formed by punching out many steel sheets 4 by a die and laminating in the same way as in the above embodiment. One end of the yoke 2 is made of a steel sheet 4' by having the steel sheet 4 deviated in a rotating direction. The steel sheets 4 have caulking sections 8 which are formed by denting the steel sheets in part, and the caulking sections 8 are mutually press-fitted to be laminated into one body. The permanent magnets 3, 3 for the field are moved in the direction R shown in the drawing to be respectively inserted into the slots 6, 6d. Then a steel sheet 4" deviated in a rotating direction with the hole 7 as the center integrally press-fitted by the caulking sections 8.

Figure 11:
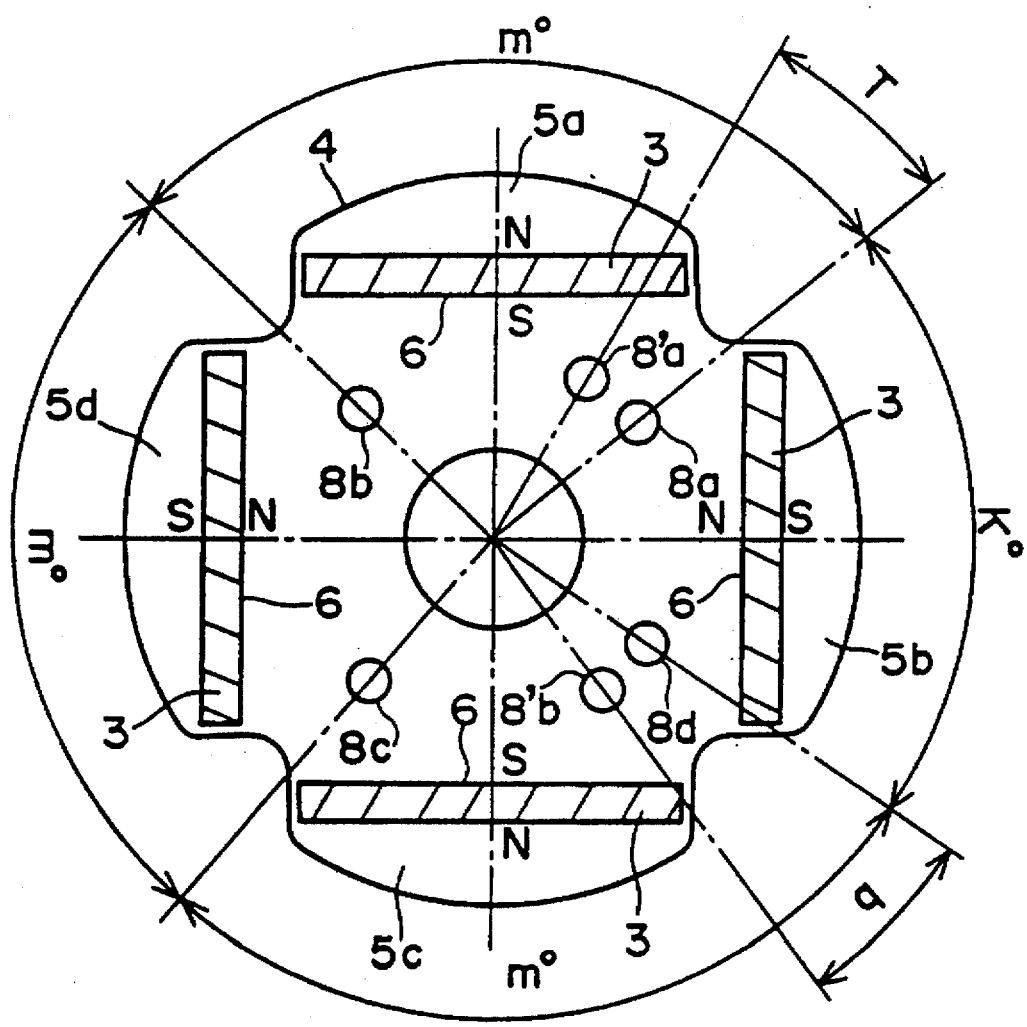
FIG. 11 is a sectional view of the permanent magnet rotor of this invention.

FIG. 11 shows a sectional view of the steel sheet 4. The slots 6, 6 are at bases of the magnetic poles 5a, 5b, 5c and 5d of the steel sheet 4 and disposed at substantially equal distance from the rotatable shaft of the yoke. The permanent magnets 3, 3 for the field are respectively inserted in the slots 6, 6, The permanent magnets 3, 3 for the field are disposed so that the outer periphery of the yoke 2 has the magnetisms of N and S poles alternately. Furthermore, the steel sheet 4 has caulking sections 8a, 8b, 8c and 8d inside of the permanent magnets for the field to mutually press-fit the steel sheets, and the caulking sections 8a, 8b, 8c and 8d are mutually press-fitted for laminating.

Furthermore, intervals of the caulking sections 8a, 8b, 8c and 8d with respect to the rotatable shaft are m between the caulking sections 8a and 8b, between the caulking sections 8b and 8c, and between the caulking sections 8c and 8d; and k between the caulking sections 8d and 8a, and determined to be p×m≠360° (p is the number of caulkings) and m≠k.

And, a gap 8'a is close to the caulking section 8a so as to be able to be press-fitted with one of the caulking sections 8a, 8b, 8c and 8d, and a gap 8'b is close to the caulking section 8d so as to be able to be press-fitted with one of the caulking sections 8a, 8b, 8c and 8d. An interval T (an angle with respect to the rotatable shaft) between the gap 9a and the caulking section 8a is set to be T=p×m−360° (p×m>360°), and an interval q (an angle with respect to the rotatable shaft) between the gap 8'b and the caulking section 8d is set to be q=360°−p×m (p×m>360°). And, the caulking sections 8a, 8b, 8c and 8d and the gaps 8'a, 8'b are on the same circumference with respect to the rotatable shaft.

Figure 12:
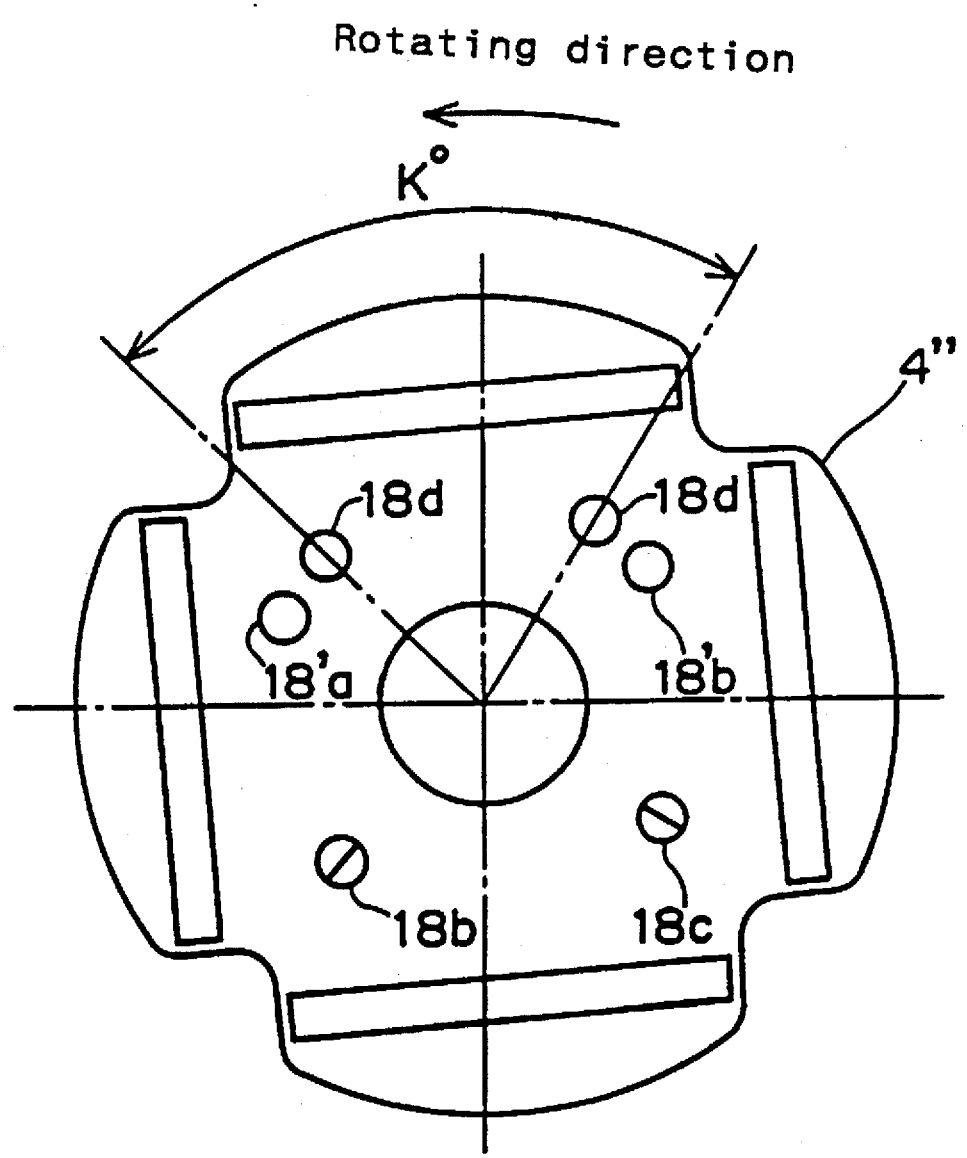
FIG. 12 is a sectional view of the steel sheet of this invention turned in a rotating direction by m°.

FIG. 12 shows a sectional view (steel sheet 4") of the steel sheet 4 deviated in a rotating direction by m°. Caulking sections 18a, 18b, 18c and 18d of the steel sheet 4" correspond to the caulking sections 8a, 8b, 8c and 8d which are not deviated, and gaps 18'a, 18'b correspond to the gaps 8'a, 8'b which are not deviated.

Figure 13:
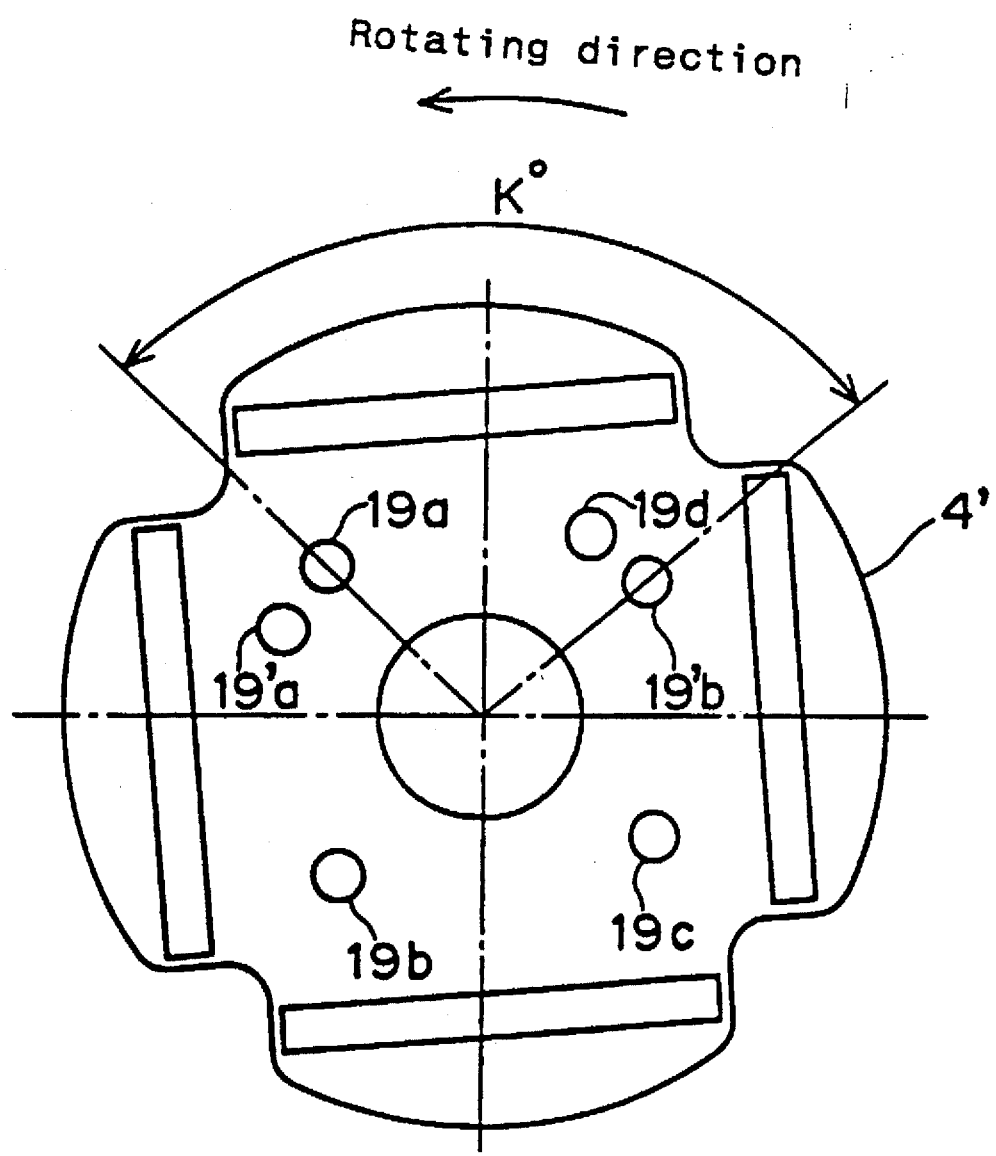
FIG. 13 is a sectional view of the steel sheet of this invention turned in a rotating direction by m°.

FIG. 13 shows a sectional view (steel sheet 4') of the steel sheet 4 deviated in a rotating direction by m° and all caulking sections 8a, 8b, 8c and 8d pulled out to leave gaps. Gaps 19a, 19b, 19c and 19d of the steel sheet 4' correspond to the caulking sections 8a. 8b, 8c and 8d which are not deviated, and the gaps 19'a, 19'b correspond to the gaps 8'a, 8'b which are not deviated. The gaps 19a, 19b, 19c and 19d, when a die is lowered deeper to press the steel sheets, provide completely hollow caulking sections, and when lowered shallow, provide caulkings.

Figure 14:
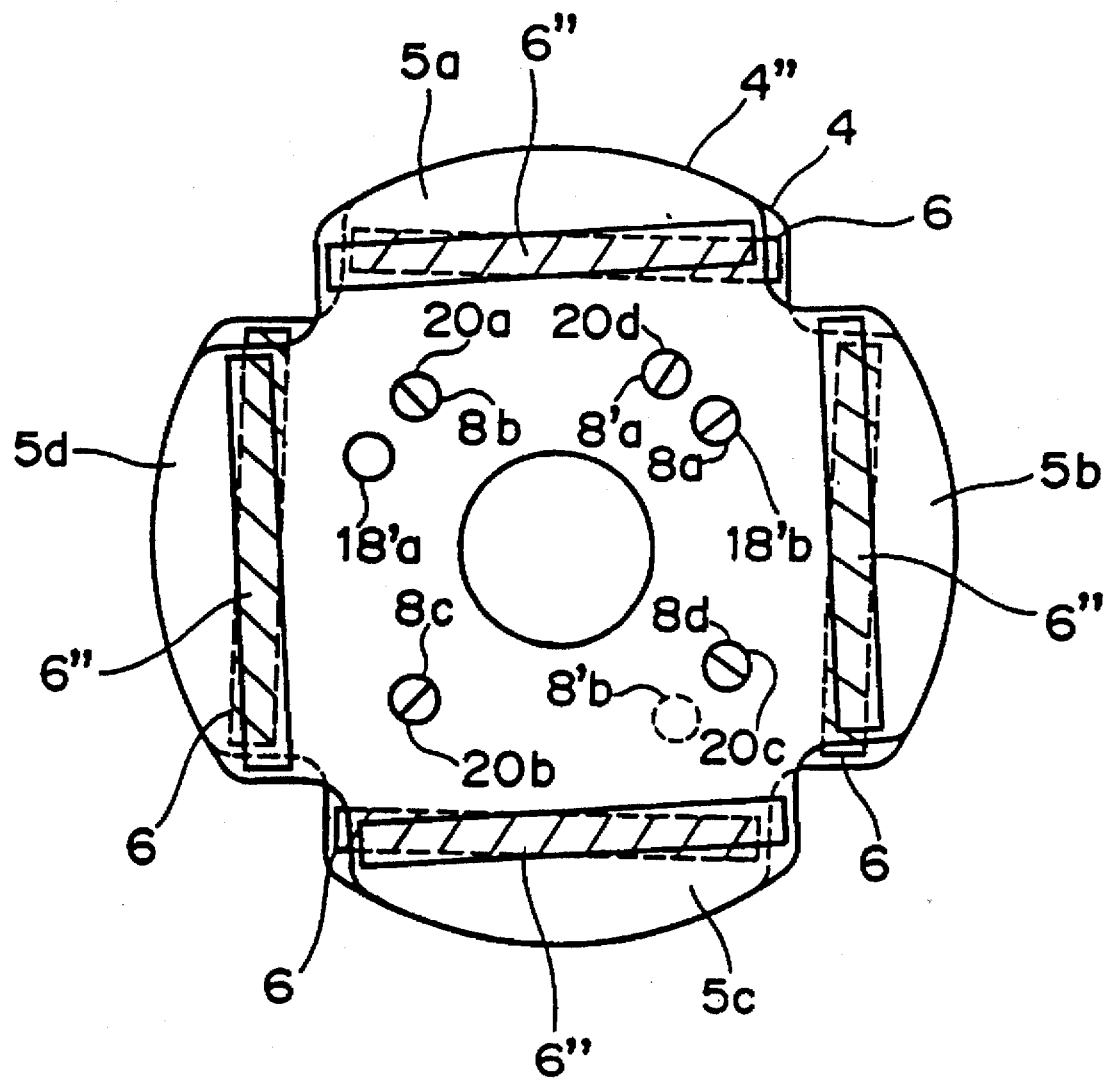
FIG. 14 is a sectional view of the permanent magnet rotor of this invention.

FIG. 14 shows that the steel sheet 4 is caulked to the steel sheet 4" from above. The caulking sections 20d, 20a, 20b and 20c of the steel sheet 4" are placed on the gap 8'a and the caulking sections 8b, 8c and 8d of the steel sheet 4. And, the steel sheet 4" can be turned in the opposite direction to place the caulking sections 20b, 20c, 20d and 20a of the steel sheet 4" on the caulking sections 8a, 8b and 8c and the gap 8'b.

The gap 8'b of the steel sheet 4 is required to be put on the above steel sheet by turning in the opposite direction and eliminates directionality in laminating the steel sheets. In addition, when the steel sheet 4" is stacked, the permanent magnets 3, 3 for the field have the slots 6", 6" of the steel sheet 4" held inclined with respect to the slots of the steel sheet 4 as shown in the drawing. Since the inclination of the slots slightly interfere with a part of the outer periphery of the end faces of the permanent magnets 3, 3 for the field, magnetic fluxes substantially do not leak from the magnet end faces. Furthermore, since the permanent magnets 3, 3 for the field are inserted in the slots 6, 6 of the steel sheet 4 in the same way as in prior art, no extra force is applied to the slots. And, even when an adhesive is used to fix the permanent magnets 3, 3 for the field and the rotor is used in a refrigerant or pressurizing fluid, the dissolution of the adhesive in the refrigerant or pressurizing fluid does not cause the permanent magnets 3, 3 for the field to come out by virtue of the steel sheet 4". Besides, the permanent magnets for the field can be fixed regardless of the processing precision of the permanent magnets for the field.

Figure 15:
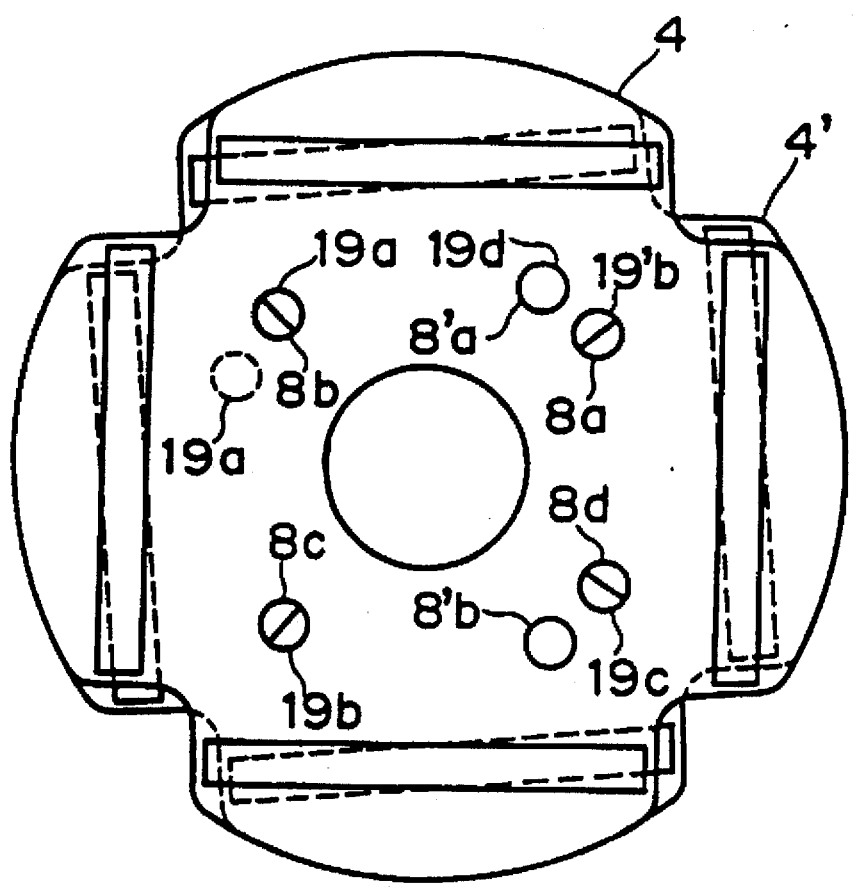
FIG. 15 is a sectional view of the permanent magnet rotor of this invention.

FIG. 15 shows that the steel sheet 4 is caulked to a steel sheet 4' from above. In the drawing, the caulking sections 8a, 8b, 8c and 8d of the steel sheet 4 are placed on gaps 19a, 19b, 19c and 19'b of the steel sheet 4'. The stacking of the steel sheet 4 can result in the same effect as in FIG. 14.

Figure 16:
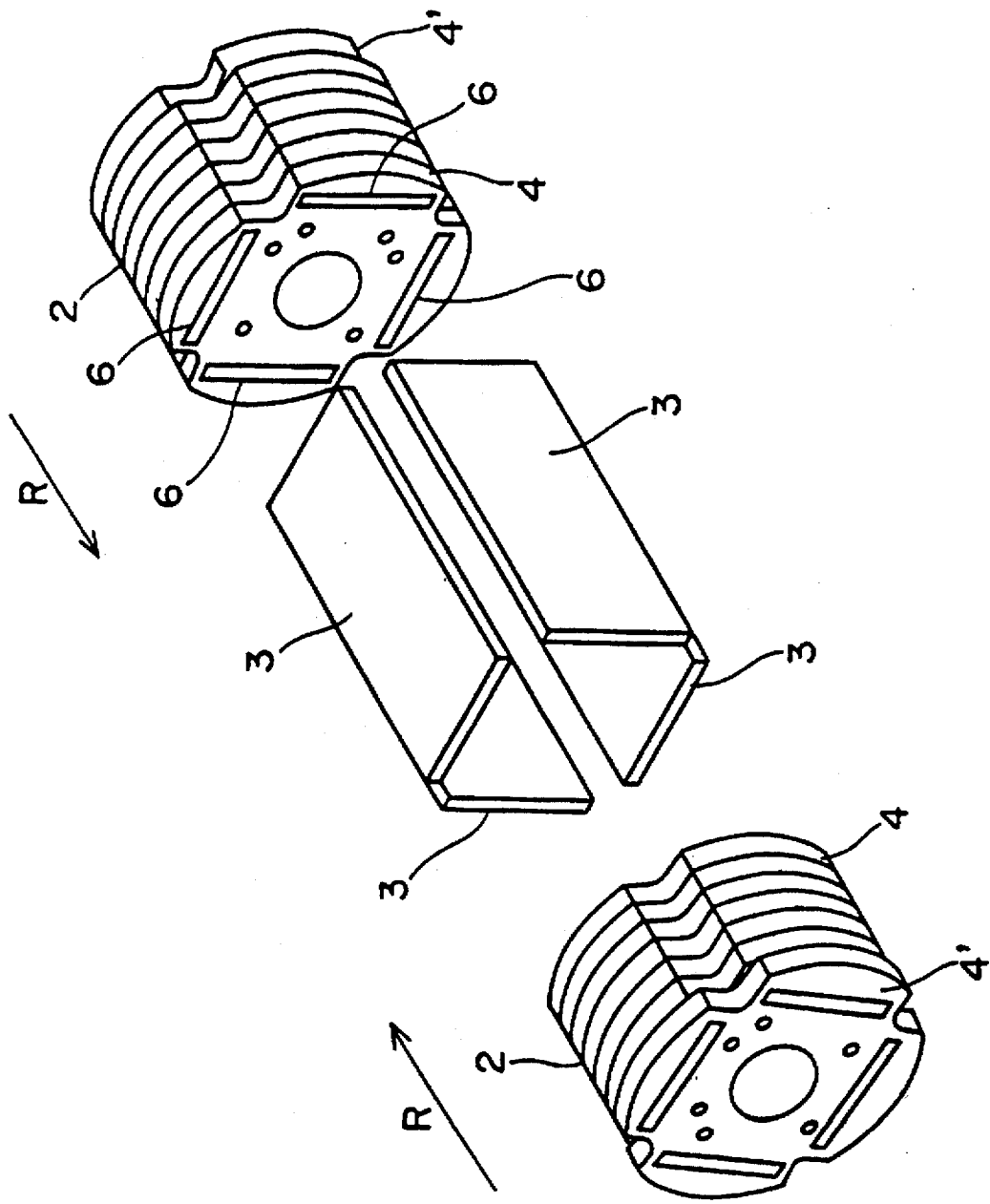
FIG. 16 is a perspective view showing the permanent magnet rotor in an exploded state of another embodiment of this invention.

FIG. 16 shows an exploded view of the permanent magnet rotor according to another embodiment of the permanent magnet rotor. A yoke 2 is divided into two, steel sheets 4 are caulked to each steel sheet 4' from above, and these yokes 2 are moved in directions R to insert the permanent magnets 3, 3 for the field. Positioning of the magnetic poles of each yoke 2 is determined by the permanent magnets 3, 3 for the field and, in this case, the positioning can be made easily because plate permanent magnets for the field are used. Since the permanent magnets for the field have a deviated steel sheet and slot at either end of the yokes, they do not come out by being prevented by them. And the same effect can be obtained when the slots of the end steel sheet of the yokes have a different shape.

Figure 17:
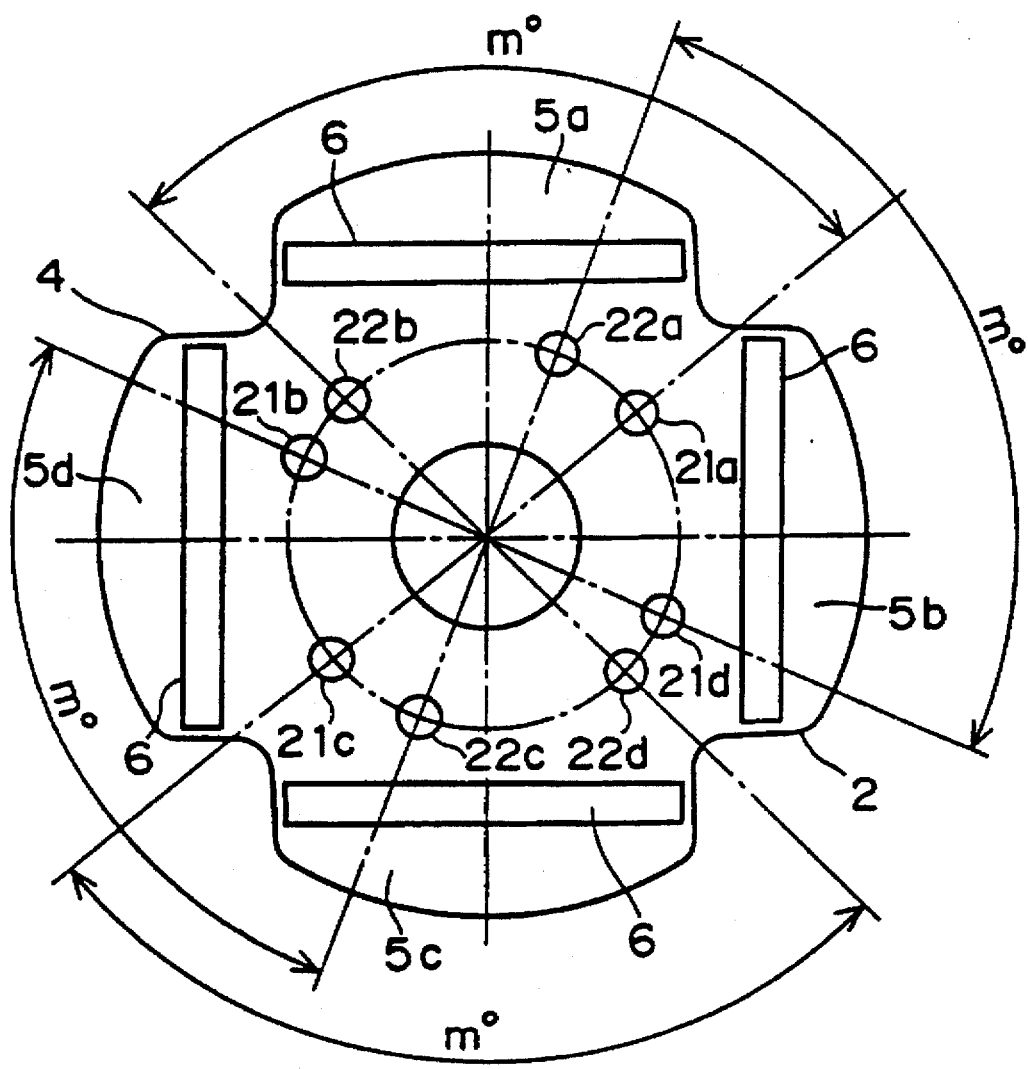
FIG. 17 is a sectional view of the permanent magnet rotor of another embodiment of this invention.

FIG. 17 shows a sectional view of the steel sheet according to another embodiment of the permanent magnet rotor. Slots 6, 6 are disposed in bases of magnetic poles 5a, 5b, 5c and 5d of a steel sheet 4 at substantially equal distance from the rotatable shaft of the yoke. A permanent magnet for a field is inserted in these slots 6, 6. Furthermore, the steel sheet 4 has caulking sections 21a, 21b, 21c and 21d formed inside of the permanent magnets for the field to mutually press-fit the steel sheets and gaps 22a, 22b, 22c and 22d capable of press-fitting the caulking sections 21a, 21b, 21c and 21d even when the steel sheets are turned, and by turning the above caulking sections 21a, 21b, 21c and 21d by m°, the caulking sections 21a, 21b, 21c and 21d are fitted in the gaps 22a, 22b, 22c and 22d. An interval m between the caulking section 21a and the gap 22b is determined to be p×m≠360° (p is the number of caulkings, m an interval between the caulking and the gap). And the caulking and the gap are point symmetrical with respect to the rotatable shaft and they are on the same circumference with the rotatable shaft at the center, so that the steel sheets are well balanced at a high-speed rotation.

Figure 18:
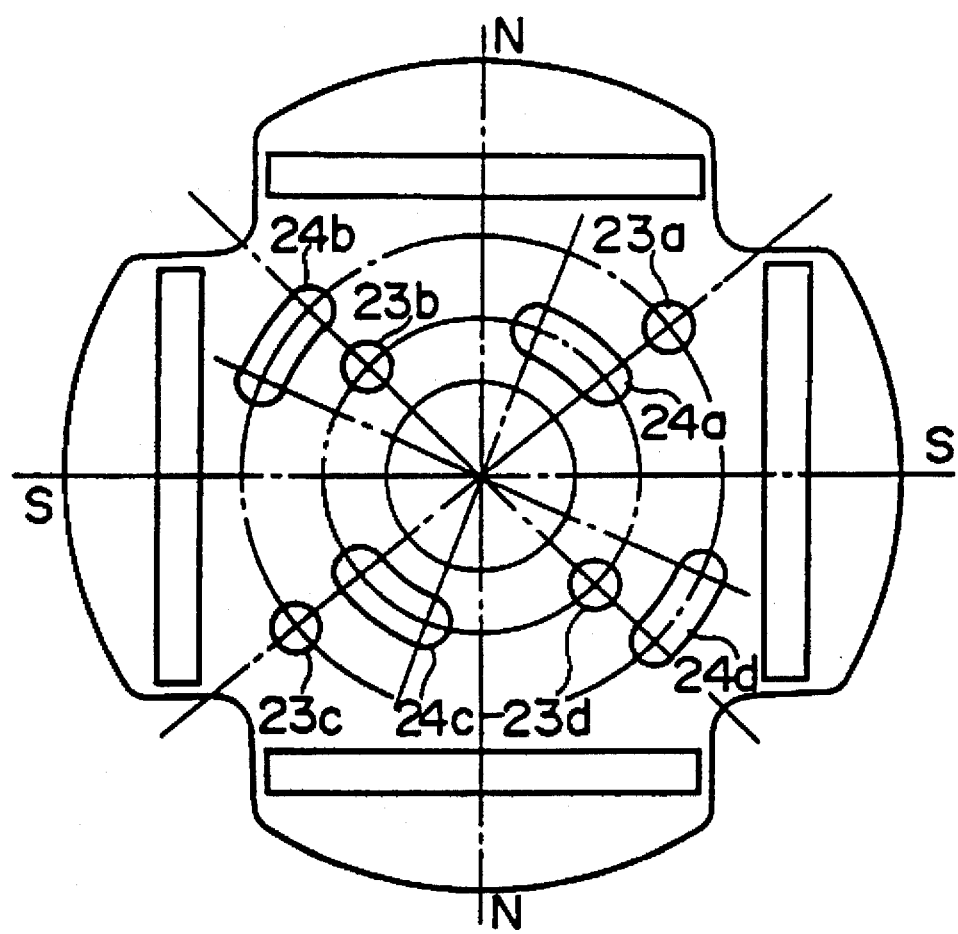
FIG. 18 is a perspective view of the permanent magnet rotor of another embodiment of this invention.

FIG. 18 shows a sectional view of the steel sheet according to another embodiment of the permanent magnet rotor. In this embodiment, the steel sheet has caulking sections 23a, 23b, 23c and 23d and oval gaps 24a, 24b, 24c and 24d capable of press-fitting the caulking sections 23a, 23b, 23c and 23d by turning the steel sheet, and is laminated by mutually press-fitting the caulking sections 23a, 23b, 23c and 23d. The caulking sections 23a, 23c and the gaps 24b, 24d are on the same circumference, and the caulking sections 23b, 23d and the gaps 24a, 24c are on a circumference different from the above circumference, so that the gap area can be made long on the circumference, thus forming an oval shape in FIG. 18. Forming the gaps to an oval shape further enables to rotate at a desired very small angle. Furthermore, the caulkings and the gaps are point symmetrical with respect to the rotatable center and the steel sheets are well balanced at a high-speed rotation. In addition, the position of the gaps and the caulkings on a plurality of circumferences enables to form the gaps into a desired shape, thus allowing to reduce a weight of the yoke itself. The above caulkings are round, but not limited to it. They may be a rectangular V-shaped caulking for example. The yoke is not limited to the laminated steel sheets, but can be made of one solid metal.

Figure 19:
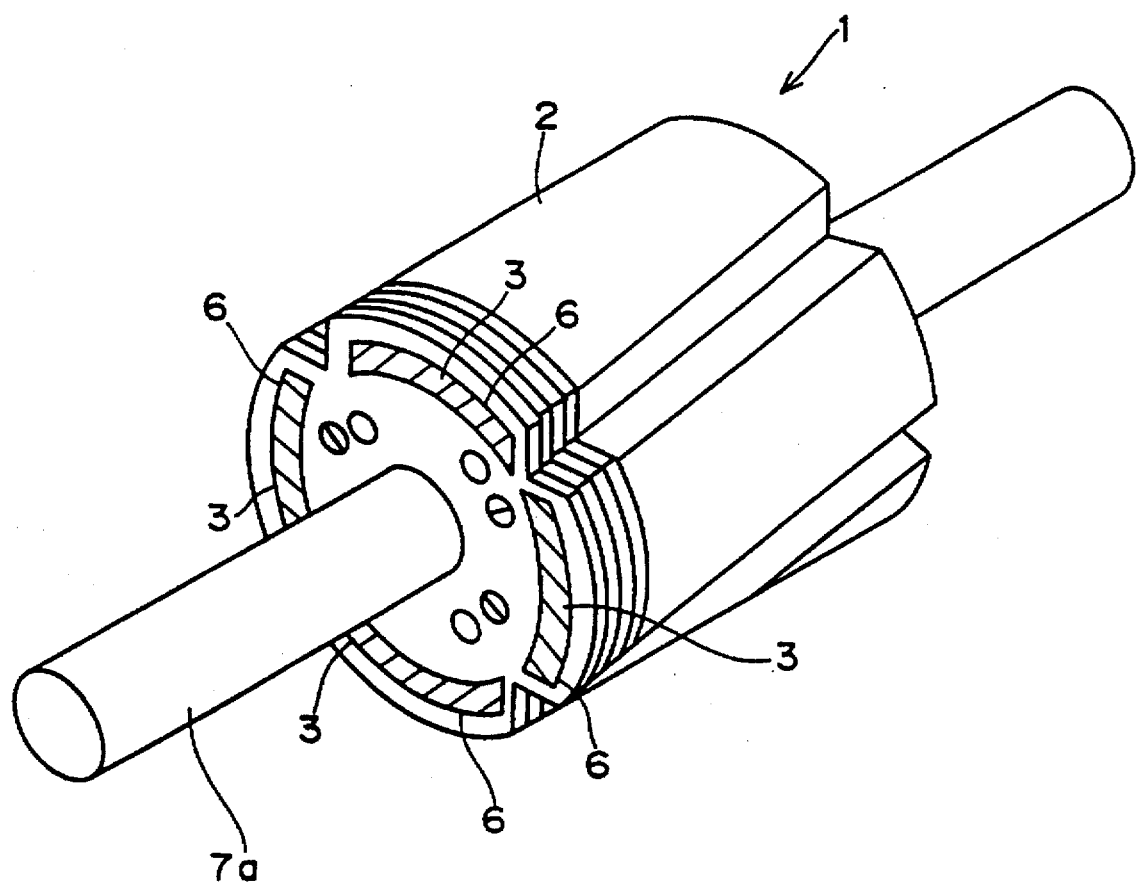
FIG. 19 is a perspective view of the permanent magnet rotor of another embodiment of this invention.

FIG. 19 shows another embodiment of the permanent magnet rotor. In this embodiment, a yoke 2 has a twist at a very small angle formed by a deviation of the pitch between the caulkings with the rotatable shaft 7a as the center, and the slots 6, 6 of the permanent magnet rotor 1 are also deviated by a very small angle within the permanent magnet rotor 1, making it possible to fix the permanent magnets for the field; and at the magnetic poles, the highest back electromotive force is always generated at the circumferential center of each rotating magnetic pole face, thus allowing to hold tile-shaped permanent magnets 3, 3 in the slots 6, 6.

Figure 20:
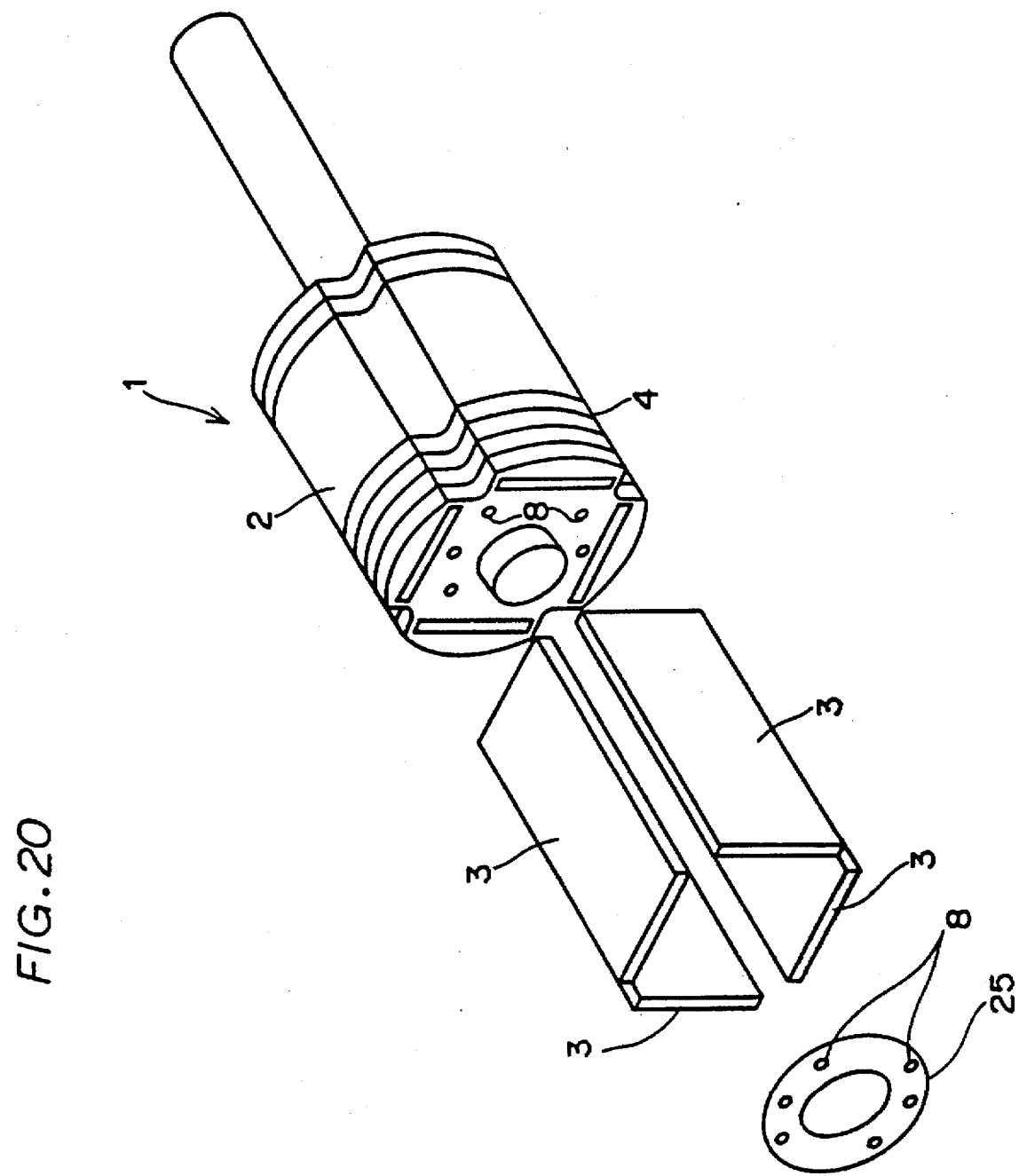
FIG. 20 is a perspective view of the permanent magnet rotor in an exploded state of another embodiment of this invention.
Figure 21:
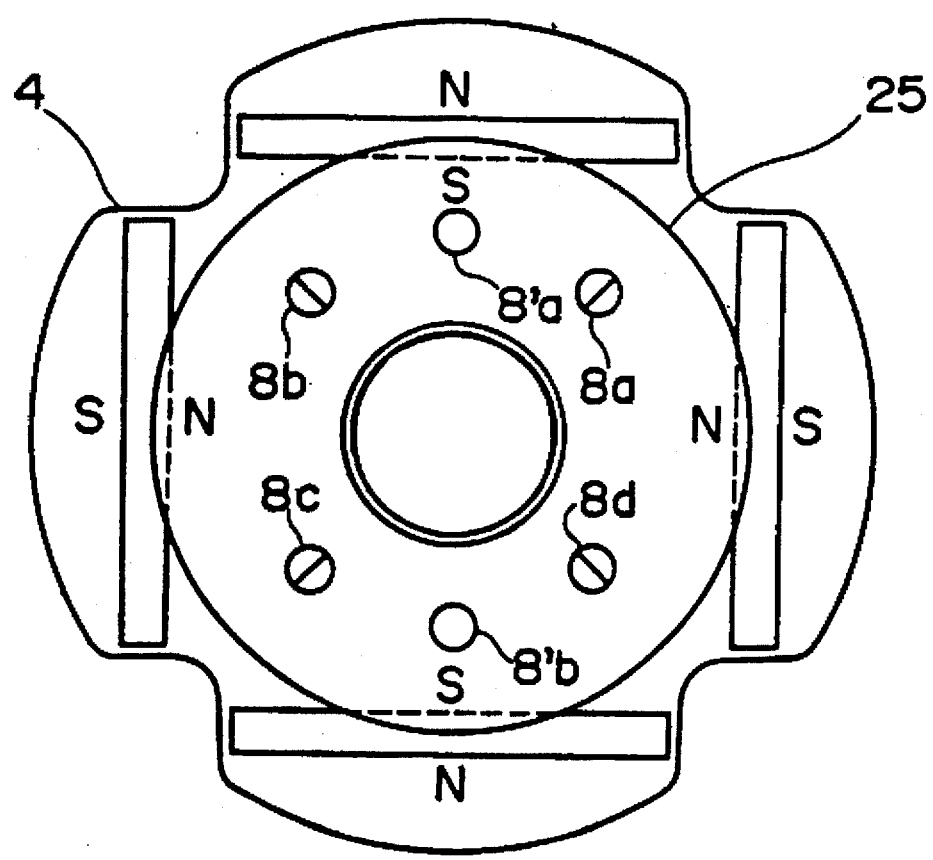
FIG. 21 is a sectional view of the permanent magnet rotor of another embodiment of this invention.

FIG. 20 shows an exploded view of the permanent magnet rotor according to another embodiment. A permanent magnet rotor 1 forms a yoke 2 by laminating a large number of steel sheets 4 into one body by the same way as above, the steel sheets 4 have caulking sections 8 formed by denting them partly, and the caulking sections 8 are mutually press-fitted to laminate into one body. Permanent magnets 3, 3 for the field are formed into a hexahedron having a rectangular cross section, and respectively inserted into the slots. Then a round iron sheet 25 having caulking sections 8 is attached to slightly cover with its outer periphery the permanent magnets 3, 3 for the field to integrally press-fit by the caulking sections 8 (see FIG. 21). The structure as described above allows to caulk the gaps in the yoke through a positioning pin in a rotating direction when caulking the steel sheets, preventing the permanent magnets for the field from coming out axially, and after shrinkage fitting of the yoke to the rotatable shaft, the permanent magnets for the field can be inserted, then the iron sheet 25 can be caulked last. Besides, even when an adhesive is used to fix the permanent magnets for the field and the rotor is used in a refrigerant or pressurizing fluid, the dissolution of the adhesive in the refrigerant or pressurizing fluid does not cause the permanent magnets for the field to come out from the slots by virtue of the steel sheet 25. And, the permanent magnets for the field can be fixed regardless of the processing precision of the permanent magnets for the field.

Thus, the permanent magnet rotor of the third embodiment has the deviated steel sheet having the same shape with the steel sheets of the yoke by a pitch of the caulking at least at one end of the slots for inserting the permanent magnet for the field to enable to axially fix the permanent magnet for the field, and can set the deviated degree of the steel sheets by a pitch of the caulking; this deviation can be set to a very small angle and prevents the magnetic fluxes at the end face of the permanent magnet for the field from leaking. And, since the steel sheet at one end is deviated, it has an effect of preventing the steel sheets from falling in the axial direction. Furthermore, the gaps in the steel sheets make it easy to press-fit and position the caulkings of the steel sheets. Since the gaps can be formed to a desired shape, the yoke itself can be made lightweighted, and the caulkings and the gaps are point symmetrical with respect to the rotatable shaft, thus making the yoke well balanced. After shrinkage fitting of the yoke to the rotatable shaft, the permanent magnets for the field can be inserted easily, and after inserting, another-shaped iron sheet can be easily fixed by caulking with reference to the gap. In addition, since high processing precision is not required thanks to the positional matching of the slots and the permanent magnets for the field, the permanent magnet rotor can be produced easily. And, the permanent magnets for the field can be prevented from coming out even when used in a refrigerant or pressurizing fluid, and the permanent magnet rotor which can be easily produced and assembled can be obtained.

Figure 22:
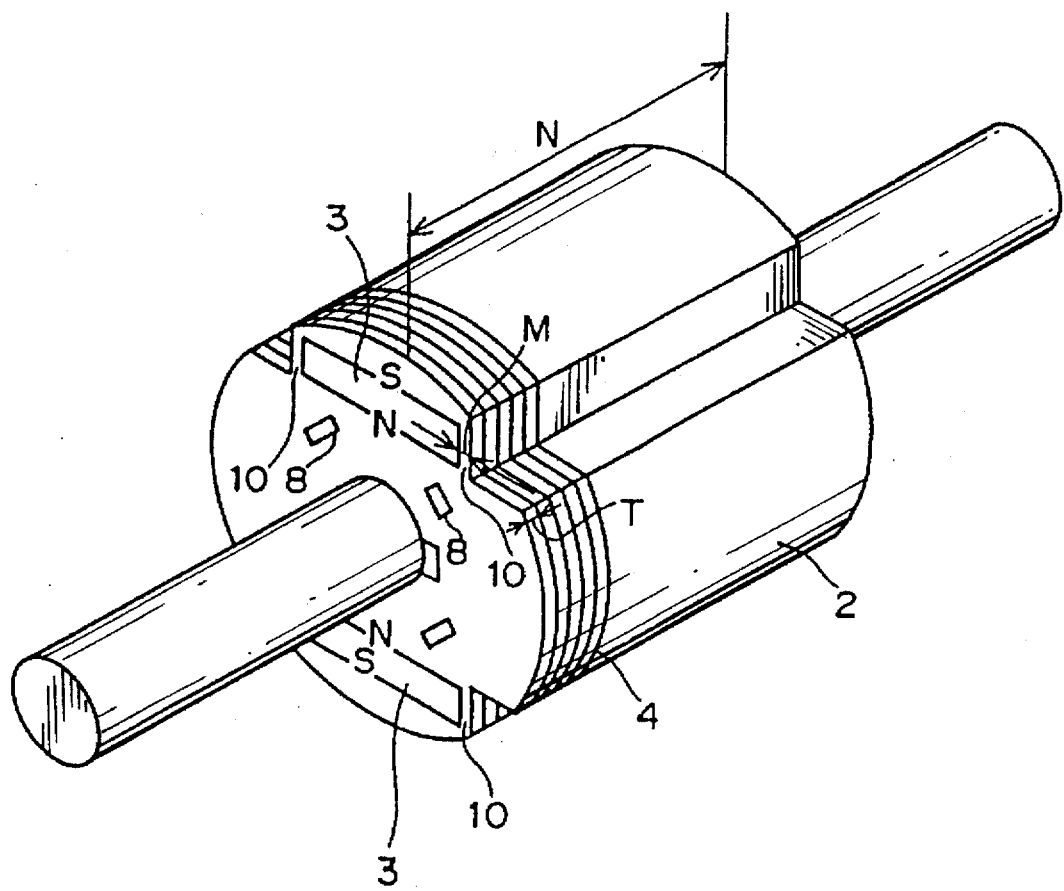
FIG. 22 is a perspective view of the permanent magnet rotor of another embodiment of this invention.
Figure 23:
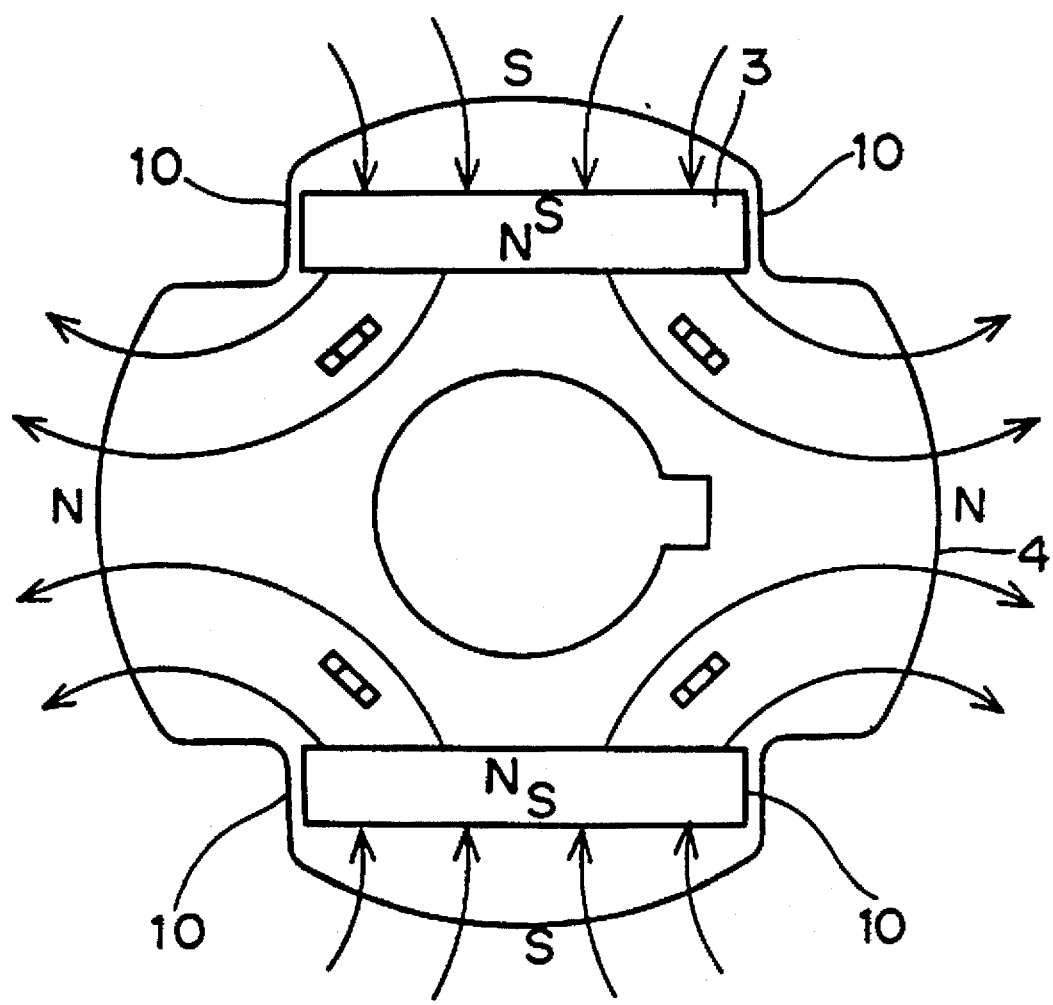
FIG. 23 is a sectional view of the permanent magnet rotor of another embodiment of this invention.

FIG. 22 shows a perspective view of the permanent magnet rotor of a fourth embodiment, and FIG. 23 shows a cross section intersecting at right angles to the rotatable shaft of the permanent magnet rotor. The permanent magnet rotor 1 has a pair of plate permanent magnets 3, 3 in this case. The yoke 2 is formed by punching out a large number of steel sheets 4 by a die and laminating. The steel sheets 4 have caulking sections 8 which are formed by partly denting the steel sheets, and are laminated into one body by mutually press-fitting the caulking sections 8. And, in this embodiment, bridges 10, 10 are produced to have a width of 0.35 mm.

In FIG. 23, the magnetic fluxes passing through the bridges 10 do not cross the stator of a motor because they do not pass the outer space of the yoke 23. Therefore, a force for rotating the permanent magnet rotor is not produced. The reduction of the magnetic fluxes passing through the bridges 10 can use the magnetic force of the permanent magnet 3 for the field more effectively.

The magnetic fluxes $\phi$ passing through the bridges 10 are calculated from the following formula. Assuming that the sectional area of the bridges 10 is S and the magnetic flux density of the steel sheet 4 is B, the following formula is established.

$$\phi = B \times S$$

It is obvious from the above formula that the magnetic fluxes passing through the bridges 10 can be reduced by making the sectional area S of the bridges 10 smaller. On the other hand, a centrifugal breakage applied to the bridges is calculated from the following formula. Assuming that the centrifugal force is F and the yielding point of the steel sheet is D, the following formula is established.

$$F/S < D$$

And, the sectional area S is calculated from the following formula. In FIG. 22, assuming that the bridge width is M, the steel sheet thickness is T, and the yoke thickness is N, the following formula is established.

$$S = M \times T \times (N/T) \times 2$$

It is obvious from the above formula that when the yoke length is fixed, the allowable width M should be increased according to the necessary strength of the bridges 10. In the above formula, (N/T) is the number of steel sheets 4, and (×2) means that one magnetic pole has two bridges 10.

Figure 24:
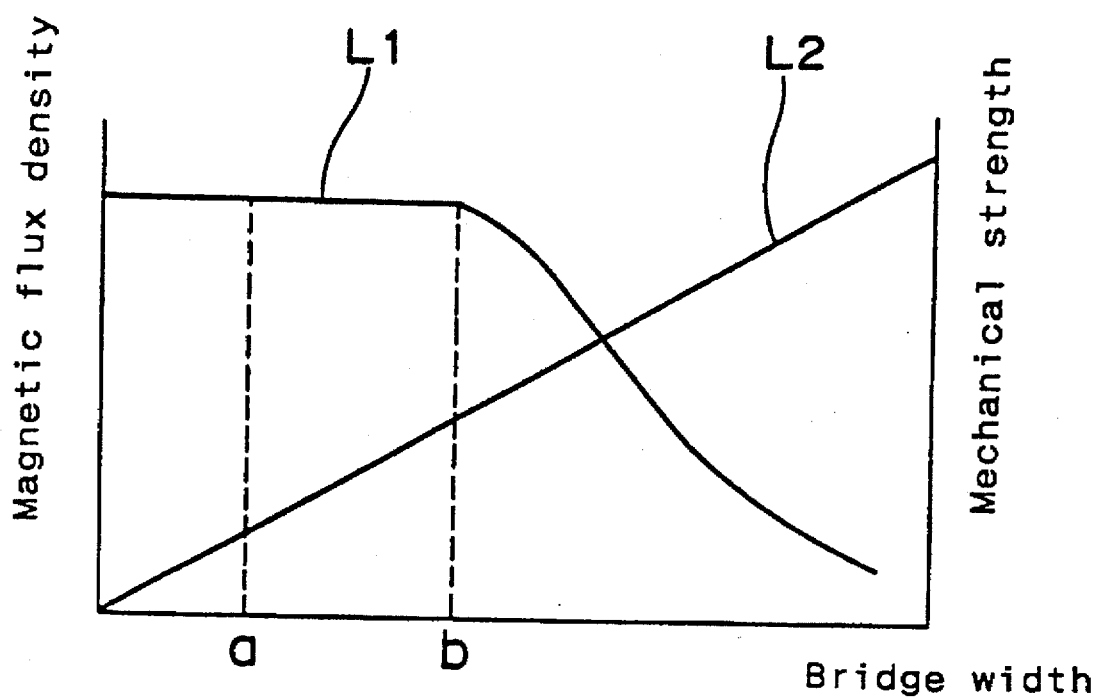
FIG. 24 is a graph showing a relation among the bridge width, the magnetic flux density of the bridges, and the mechanical strength of the bridges.

FIG. 24 shows a relation among the bridge width, the magnetic flux density of the bridges, and the mechanical strength of the bridges. More specifically, the horizontal axis shows the bridge width, and the vertical axis shows the magnetic flux density of the bridges and the mechanical strength against the centrifugal force. And, curve L1 indicates a magnetic flux density curve, and L2 indicates a mechanical strength curve against the centrifugal force. The curve L1 forms a straight line without any change between point a or a minimum width capable of being punched out by a die and point b or a minimum width of an allowable magnetic flux density, and shows that the magnetic flux density is gradually lowered with a width larger than the width of the point b.

The width of the point a capable of being punched out by a die depends on the steel sheet thickness, and the thickness is 0.1 mm, 0.35 mm or 0.5 mm. And the relation of the bridge width capable of being produced by a die is expressed as $M/T \geq 1$. For example, when the steel sheet thickness is 0.35 mm and the bridge width is 0.35 mm or more, the production can be made easily. But, the bridge width is influenced by the minimum width allowed from the mechanical strength against the centrifugal force. Therefore, when the width allowed from the mechanical strength due to the centrifugal force is within the width capable of being produced by a die, highly efficient performance with a less loss of the magnetic fluxes of the permanent magnets for the field and the minimum width capable of being produced by a die can be obtained by determining to either of the width capable of being produced by a die or the width allowed from the magnetic flux density.

And, when the width allowed from the mechanical strength due to the centrifugal force is between the width capable of being produced by a die and the width allowed from the magnetic flux density, by determining to either of the width allowed from the mechanical strength due to the centrifugal force or the width allowed from the magnetic flux density, highly efficient performance with a less loss of the magnetic fluxes of the permanent magnets for the field and capable of punching out quickly by a die can be realized.

And, when the width allowed from the mechanical strength due to the centrifugal force is equal to or greater than the width allowed from the magnetic flux density, the width allowed from the mechanical strength due to the centrifugal force is selected. In this case, it is advantageous that the production is easy by virtue of rigidity against the punching out by the die and the production cost is lowered because the steel sheet material can be a low-saturated steel sheet material.

In summary, among the width capable of being punched out, the width allowed in view of the number of passing magnetic fluxes, and the width allowed from the mechanical strength due to the centrifugal force, the bridge width at either end of the slot is determined to be equal to or larger than larger one of the width capable of being punched out or the width allowed from the mechanical strength due to the centrifugal force and equal to or smaller than the width allowed in view of the number of passing magnetic fluxes. Exceptionally, when the width capable of being punched out and the width allowed from the mechanical strength due to the centrifugal force are equal to or larger than the width allowed in view of the magnetic flux density, it is determined to be a larger one or more between the width capable of being punched out and the width allowed from the mechanical strength due to the centrifugal force.

Figure 25:
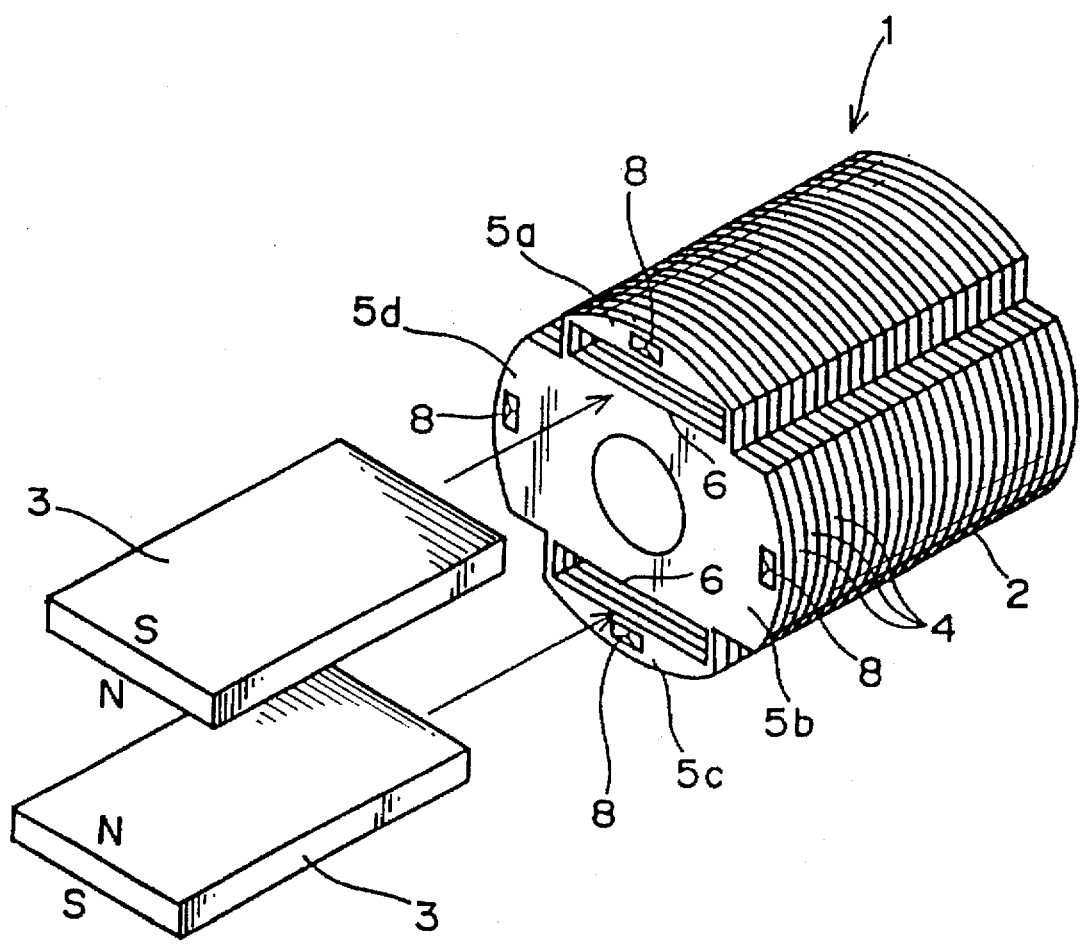
FIG. 25 is a perspective view of the permanent magnet rotor of another embodiment of this invention.
Figure 26:
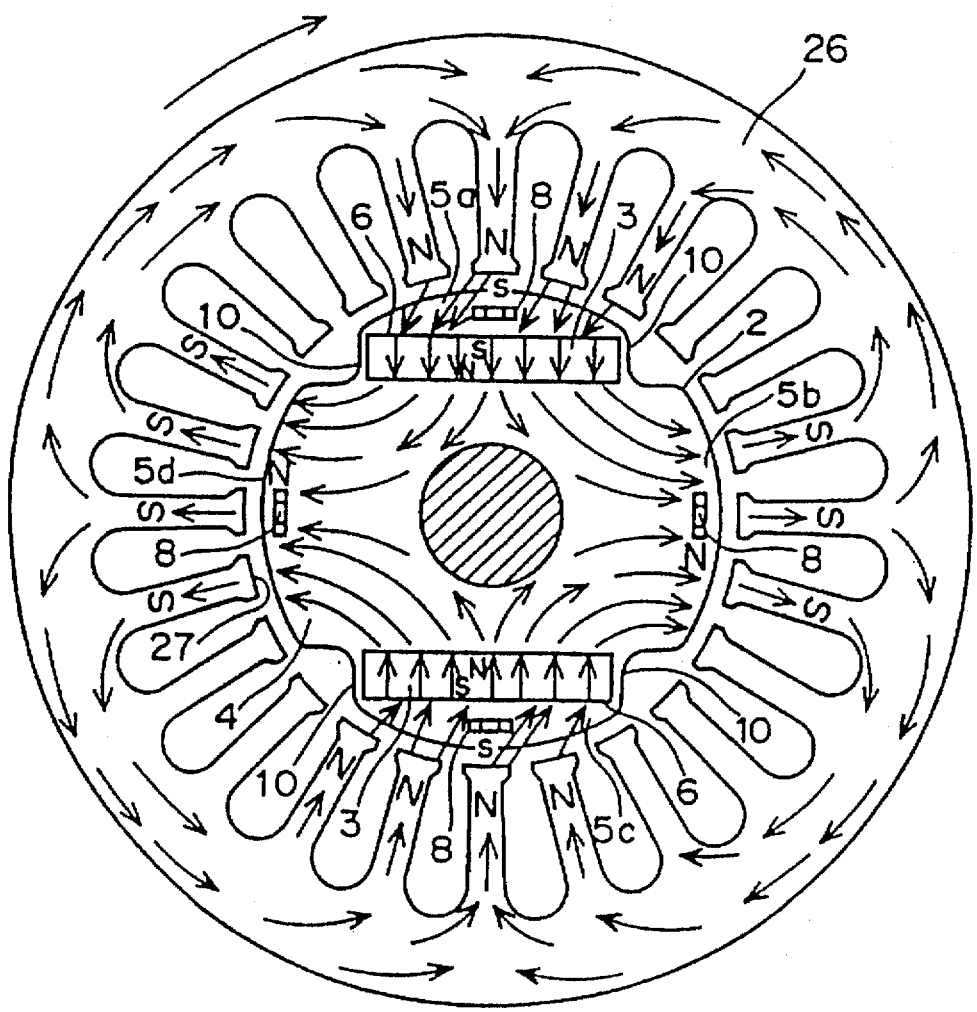
FIG. 26 is a sectional view of the permanent magnet rotor of another embodiment of this invention.

FIG. 25 shows a perspective view of the permanent magnet rotor of a fifth embodiment, and FIG. 26 shows a cross section intersecting at right angles to the rotatable shaft of the permanent magnet rotor. The permanent magnet rotor 1 has a pair of plate permanent magnets 3, 3 in this case. The yoke 2 is formed by punching out a large number of steel sheets 4 by a die and laminating. In this embodiment, the steel sheets 4 have caulking sections 8, which are formed by partly denting the steel sheets, disposed on each magnetic pole. The caulking sections 8 are formed by partly denting the steel sheet by pressing by means of a die. Therefore, each magnetic pole has gaps formed by the dented portions of the caulking sections 8.

In FIG. 26, arrows in the drawing show the flow of magnetic fluxes between each magnetic pole and stator magnetic poles. The stator 26 has a permanent magnet rotor 3 therein, and stator magnetic poles 27 are excited by coils not shown. Slots 6, 6 are in the bases of magnetic poles 5a, 5c of a yoke 2 and positioned at an equal distance from the rotatable shaft of the yoke 2. As described above, the permanent magnets 3, 3 for the field are inserted in these slots 6, 6 with the faces having the magnetism of N pole opposed to each other, and the magnetic fluxes get out of the magnetic poles 5a, 5c of the yoke 2 due to the repulsion of the magnetic poles as shown and reach the magnetic poles 5b, 5d. As a result, the magnetic poles 5a, 5c bear the magnetism of S pole, and the magnetic poles 5b, 5d the magnetism of N pole. And, the outer periphery of the yoke 2 has the four magnetic poles alternately having N and S poles.

The yoke 2 has on each magnetic pole a caulking section 8 for laminating steel sheets, and the flow of the magnetic fluxes of each magnetic pole detours around the caulking section 8 and reaches the magnetic pole face of the yoke 2 as indicated by the arrows in FIG. 26. This is because the caulking section 8 is formed by denting the steel sheet to form a space by the dented portion, so that the space has a low magnetic permeability with respect to the steel sheet, increasing a magnetic resistance at the caulking section 8. Therefore, the magnetic fluxes are divided to pass both sides of the caulking section 8 of the magnetic pole and not concentrated toward the rotating direction. Thus, the back electromotive force generated by the magnetic fluxes is largest at the center of the magnetic pole, allowing to prevent an erroneous detection of the position of each magnetic pole of the permanent magnet rotor.

And, the caulking section 8 disposed on the magnetic poles 5a to 5d makes an external force difficult to be applied to bridges 10 connecting the base and the leading end of the magnetic pole. And even when an unexpected external force is applied to the leading end of the magnetic pole, the steel sheets of the yoke 2 do not suffer from the occurrence of separation and gaps.

Figure 28:
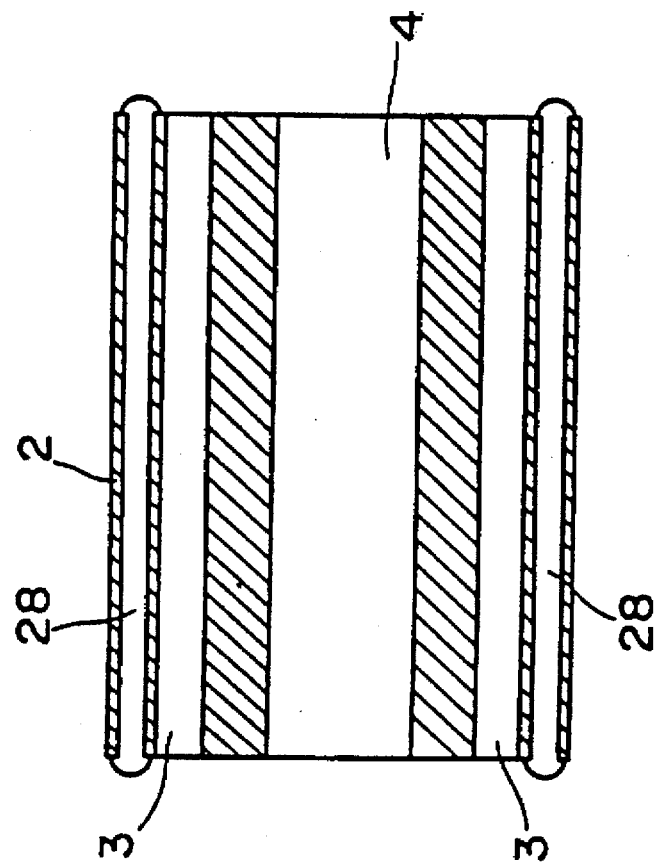
FIG. 28 is a sectional view of the yoke of the permanent magnet rotor of this invention.
Figure 27:
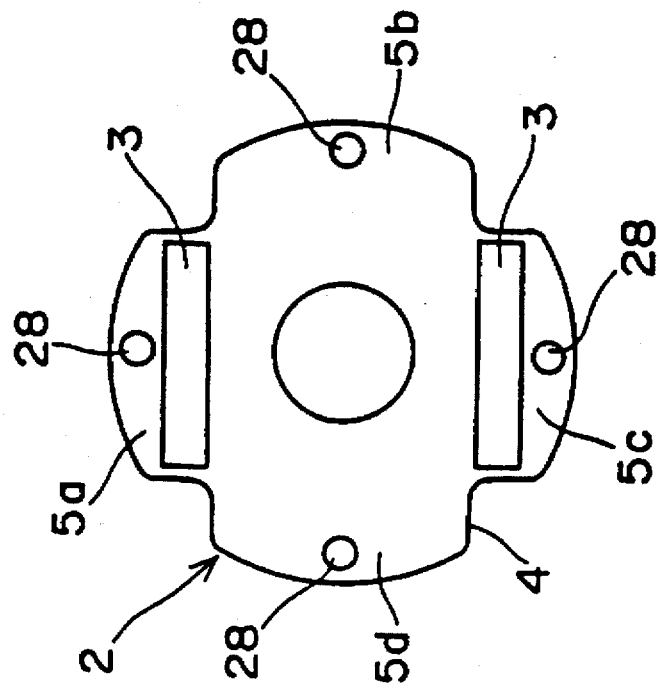
FIG. 27 is a front view of the yoke of the permanent magnet rotor of this invention.

FIG. 27 and FIG. 28 are explanatory views of another embodiment of the permanent magnet rotor, showing a front view and a sectional view of the yoke 2. The above embodiment has used caulkings by denting the steel sheets for connecting the steel sheets 4. But, this embodiment forms a through hole in magnetic poles 5a, 5b, 5c and 5d, and inserts a shaft 28 to connect the laminated steel sheets 4, thereby forming the yoke 2. The shaft 28 is aluminum, stainless steel or other nonmagnetic materials to increase a magnetic resistance at the shaft, resulting in obtaining the same effect as in the above embodiment. In this embodiment, each end of the connection shaft 28 is fixed by caulking, but desired ways such as screwing and welding can be adopted.

The connecting portion and the space of the magnetic poles 5a to 5d are not required to be positioned at the center of the magnetic poles. They may be positioned on the side of the rotating direction of the rotor with respect to the center of the magnetic pole and approached just next to the leading end of the magnetic pole. Disposition of the space or connecting portion on the side of the rotating direction interrupts the flow of the magnetic fluxes which are concentrated toward the rotating direction, thus enhancing the effect of accelerating the concentration of the magnetic fluxes on the center of the magnetic pole. The magnetic fluxes which are prevented from concentrating toward the rotating direction are dispersed at the space or connecting portion, and again concentrated toward the rotating direction on the magnetic pole. But, the disposition of the space or connecting portion at the position immediately next to the leading end of the magnetic pole in the rotating direction of the rotor causes the dispersed magnetic fluxes to reach the leading end of the magnetic pole prior to concentrating toward the rotating direction, resulting in concentrating the magnetic fluxes on the center of the magnetic pole. Thus, it is more assured that an erroneous detection of the position of each magnetic pole is prevented.

The connecting portion or space is not limited to be one on each magnetic pole and may be disposed in more than one. The above embodiment has been described using the rotor having the structure that the four magnetic poles are formed on the outer periphery of the yoke and the permanent magnet for the field is inserted in every other magnetic poles. But, this embodiment is not limited to the above structure and can be applied to a case that a desired even number of magnetic poles is formed and the permanent magnet for the field is inserted in each magnetic pole.

In the permanent magnet rotor of this embodiment, the portion for connecting the steel sheets is disposed on each magnetic pole, so that the magnetic resistance at the connecting portion is increased to suppress the concentration of the magnetic fluxes toward the rotating direction. And the disposition of the connecting portion on each magnetic pole so as to accelerate the magnetic fluxes to concentrate on the center of each magnetic pole generates the back electromotive force largest at the center of the magnetic pole, thus enabling to obtain a position sensorless brushless motor which can accurately detect the position of the magnetic pole of the permanent magnet rotor.

Besides, the disposition of the connecting portion on each magnetic pole makes the external force hard to be transmitted to the bridges connecting the base and the leading end of the magnetic pole, and even when the unexpected external force is applied to the leading end of the magnetic pole, the steel sheets of the yoke forming the permanent magnet rotor are prevented from suffering the occurrence of separation and gaps, thus capable of providing the permanent magnet rotor excelling in strength.

Figure 29:
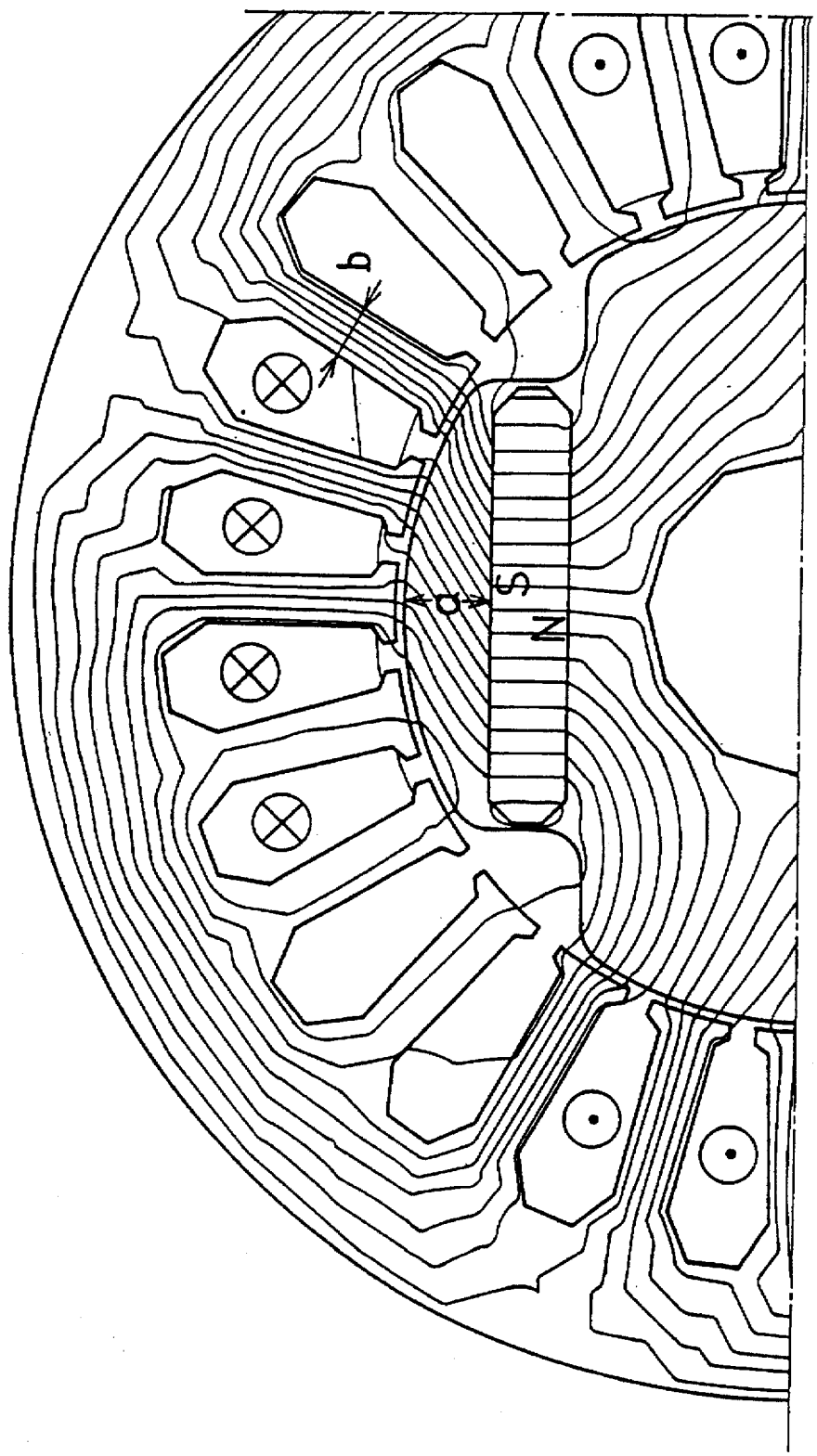
FIG. 29 is a computer-analyzed diagram showing the flow of magnetic fluxes on a cross section intersecting at right angles to the rotatable shaft of the permanent magnet rotor of a three-phase, four-pole motor of this invention with the rotor rotating satisfactorily.

FIG. 29 is a computer-analyzed diagram showing the flow of magnetic fluxes on a cross section intersecting at right angles to the rotatable shaft of the permanent magnet rotor of a three-phase, four-pole motor (24 poles) with the rotor rotating satisfactorily. It is seen from the flow of the magnetic fluxes that the magnetic pole above the permanent magnet for the field bends the magnetic fluxes from the stator magnetic pole (pole) and the magnetic fluxes from three stator magnetic poles flow to one permanent magnet for the field. Since a half of the quantity of magnetic fluxes of the magnet passes through the magnetic pole above the permanent magnet for the field, a width a between the permanent magnet for the field and the outer periphery edge of the magnetic pole is preferably in a relation of (a=1.5×b) (including a case that a is almost (1.5×b)) with respect to a width b of the stator magnetic pole. In other words, a half of the quantity of magnetic fluxes of the magnet passes through the part a and enters 1.5 stator magnetic poles. In the case of the above (a=1.5×b), the magnetic fluxes flow easily and do not leak many because both magnetic flux densities are equal, resulting in a remarkable motor efficiency with a less loss.

Since the width b of the stator magnetic pole is generally fixed, when the width a is larger than (1.5×b), the permanent magnet for the field is relatively close to the rotatable shaft because the gap between the rotor and the stator is fixed and the magnetic pole outside the permanent magnet for the field has a large area, reducing a gap magnetic flux density outside the rotor. Furthermore, when the magnetic pole has a large area, the bridge width is increased to retain the magnitude of a centrifugal force, increasing a loss and lowering a motor efficiency. Besides, the magnet has a long magnetic path, and a leakage quantity is increased.

Conversely, when the width a is smaller than (1.5×b), the permanent magnet for the field is relatively away from the rotatable shaft and approaches to the stator, the magnetic pole outside the permanent magnet for the field has a small area, making the magnetic fluxes difficult to bend and easy to be saturated. Thus, the magnetic flux density increases and a loss (core loss) is increased, making the magnet demagnetized easily by heat.

As described above, when a is almost equal to (1.5×b), the above disadvantages can be remedied, and a cutoff can be disposed on the rotor magnetic poles (removing a local concentration of magnetic fluxes) to be described afterward while securing the strength of the bridges. It is to be understood that the above width a is larger than the bridge width.

Figure 30:
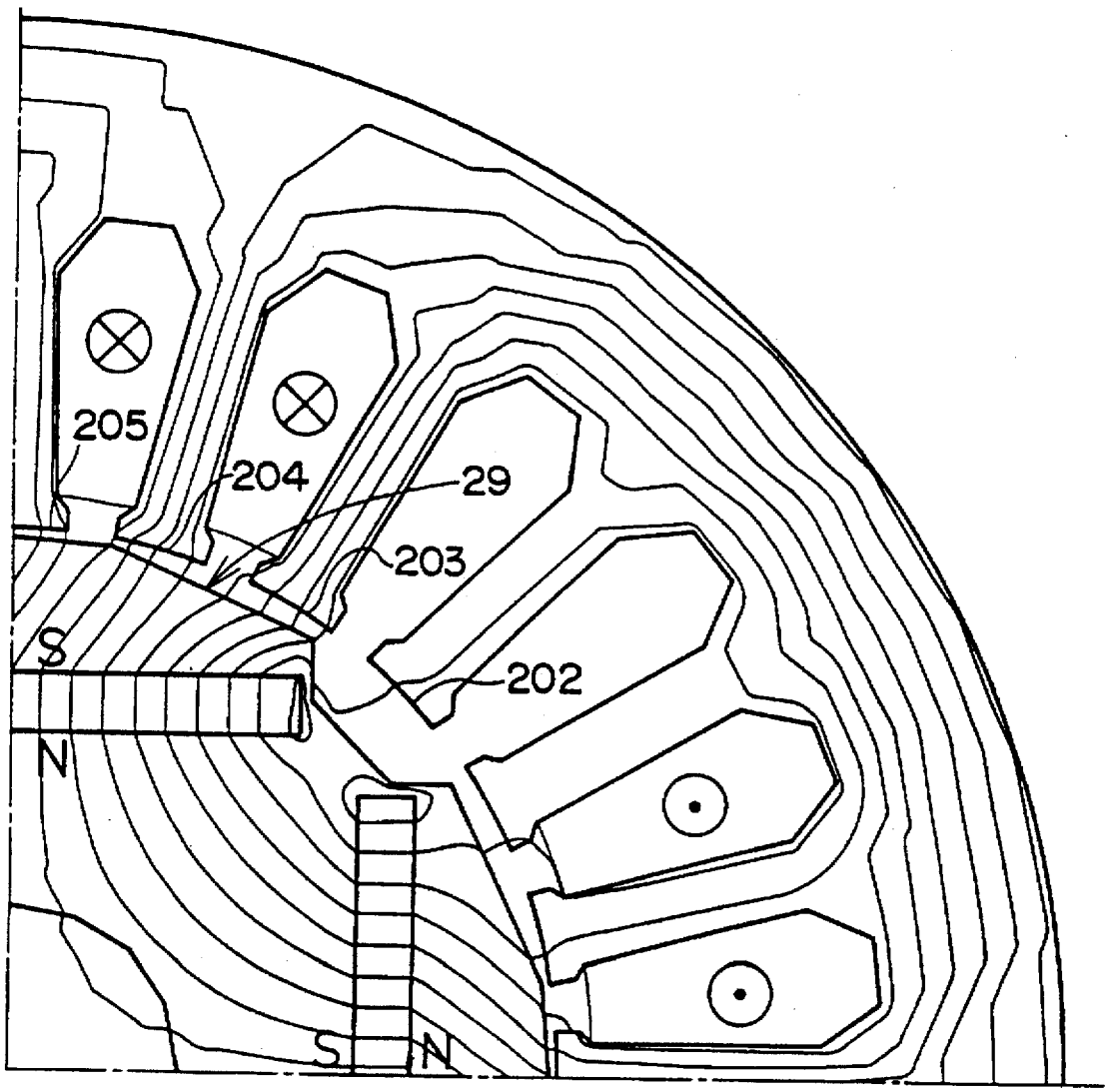
FIG. 30 is a computer-analyzed diagram showing the flow of magnetic fluxes on a cross section intersecting at right angles to the rotatable shaft of the permanent magnet rotor of a three-phase, four-pole motor of this invention with the rotor rotating.
Figure 31:
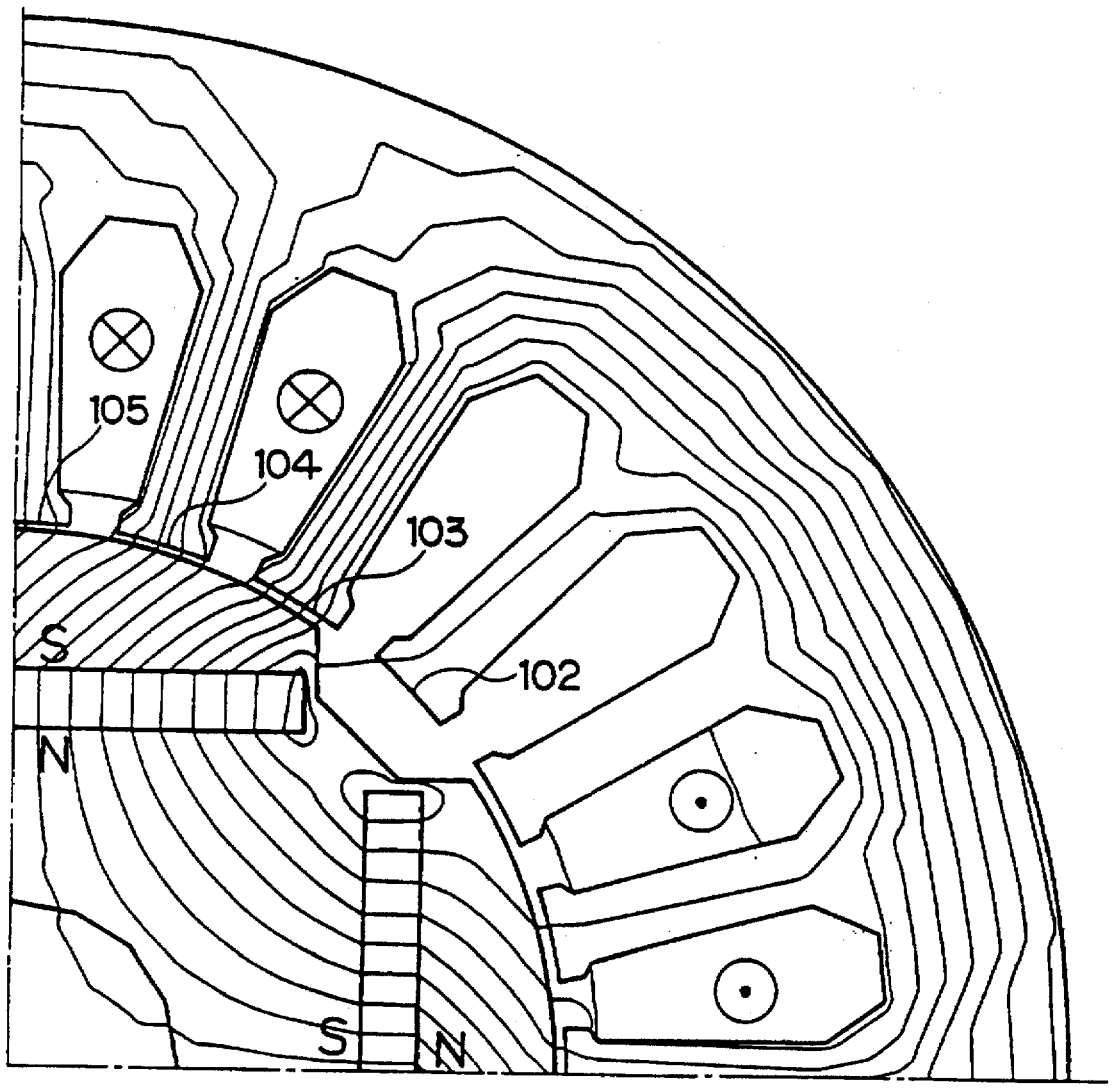
FIG. 31 is a computer-analyzed diagram showing the flow of magnetic fluxes on a cross section intersecting at right angles to the rotatable shaft of the permanent magnet rotor of a three-phase, four-pole motor of this invention with the rotor rotating.
Figure 32:
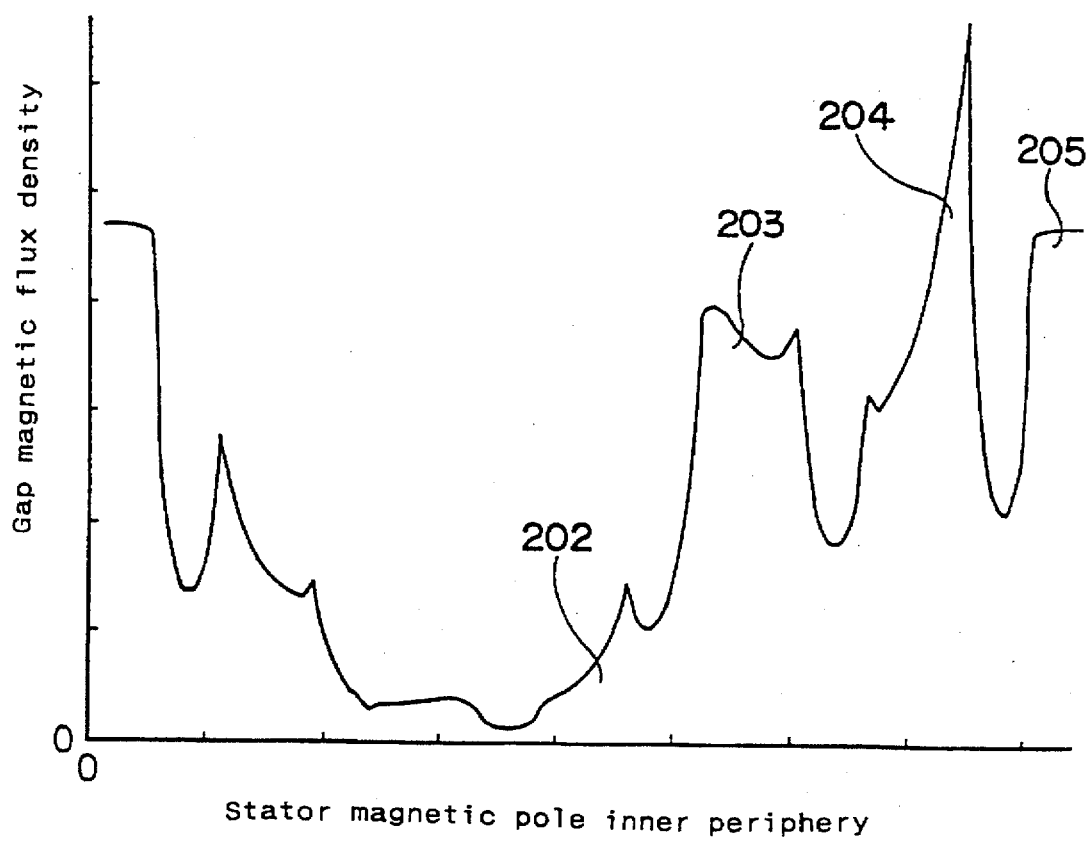
FIG. 32 is a graph showing a gap magnetic flux density.
Figure 33:
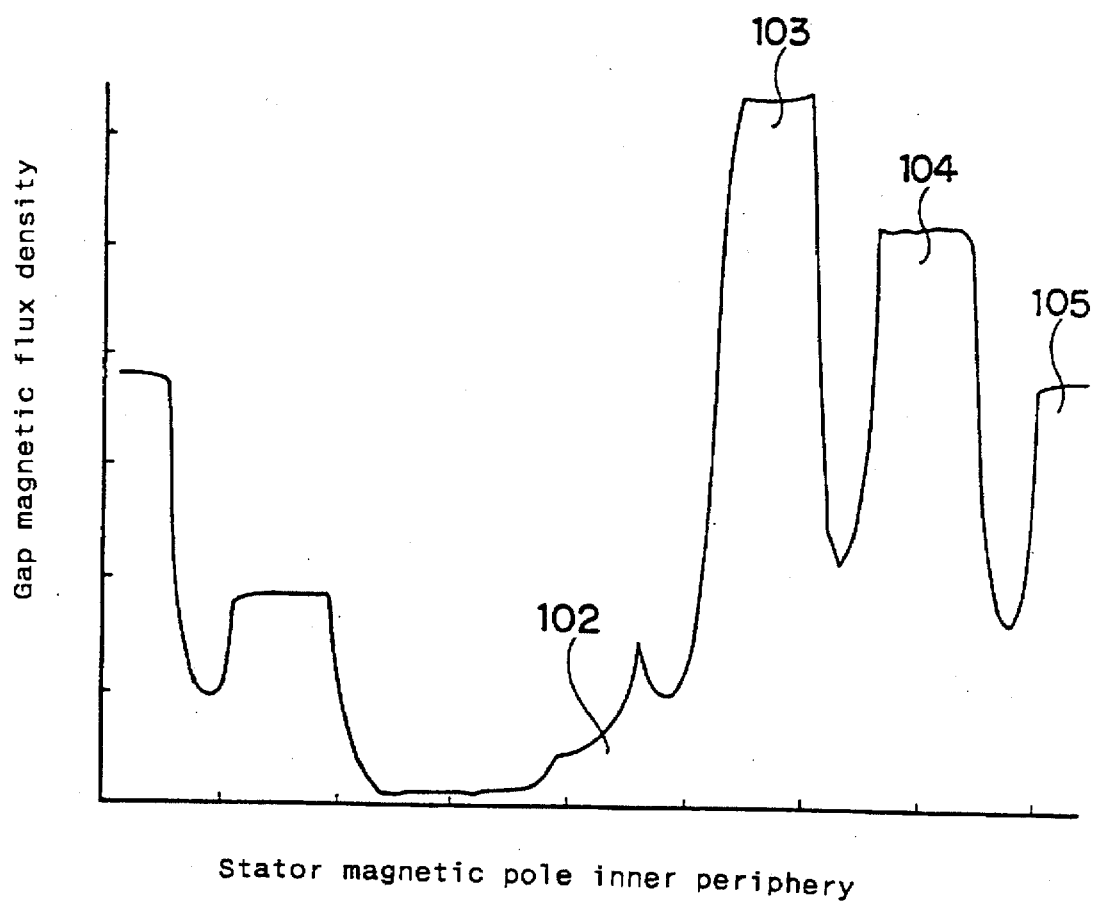
FIG. 33 is a graph showing a gap magnetic flux density.

FIG. 30 and FIG. 31 are computer-analyzed diagrams showing the flow of magnetic fluxes on a cross section intersecting at right angles to the rotatable shaft of the permanent magnet rotor of a three-phase, four-pole motor (24 poles) with the rotor rotating. FIG. 30 shows the rotor magnet pole with a cutoff 29, and FIG. 31 shows it without the same. FIG. 32 and FIG. 33 are graphs showing a gap magnetic flux density, corresponding to FIG. 30 and FIG. 31 respectively. When the cutoff 29 is not disposed, the magnetic fluxes concentrate on stator magnetic poles 103, 104, and 105 respectively, and the quantity of magnetic fluxes is in order of the magnetic flux of the magnetic pole 103, the magnetic flux of the magnetic pole 104, and the magnetic flux of the magnetic pole 105 in proportion to the passage (torque magnitude) of a current through the stator winding, the magnetic fluxes are locally saturated, the torque between the respective stator magnetic poles is not uniform, and the rotation of the rotor is varied.

Figure 34:
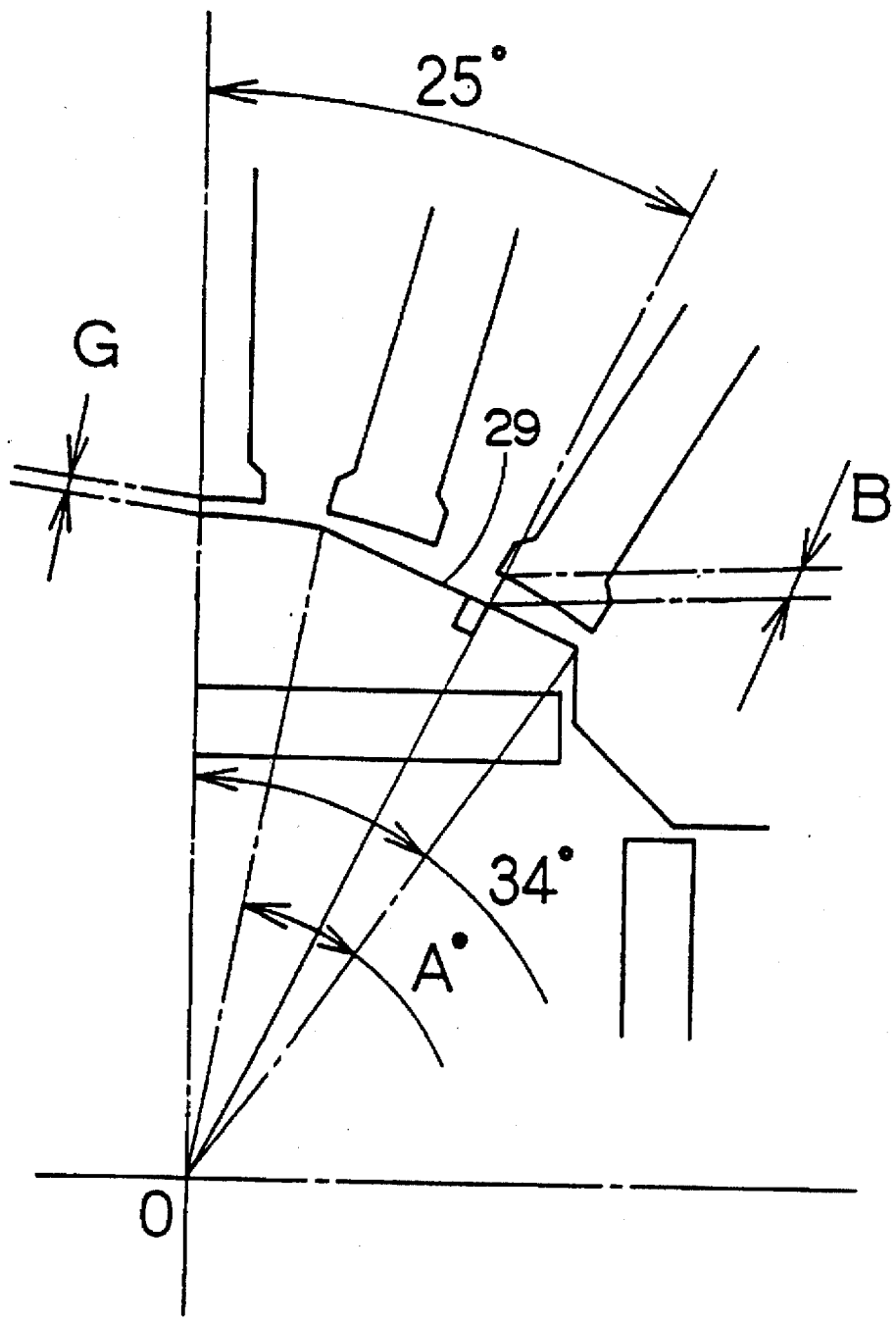
FIG. 34 is a diagram showing a relation between the permanent magnet rotor and the stator.
Figure 35:
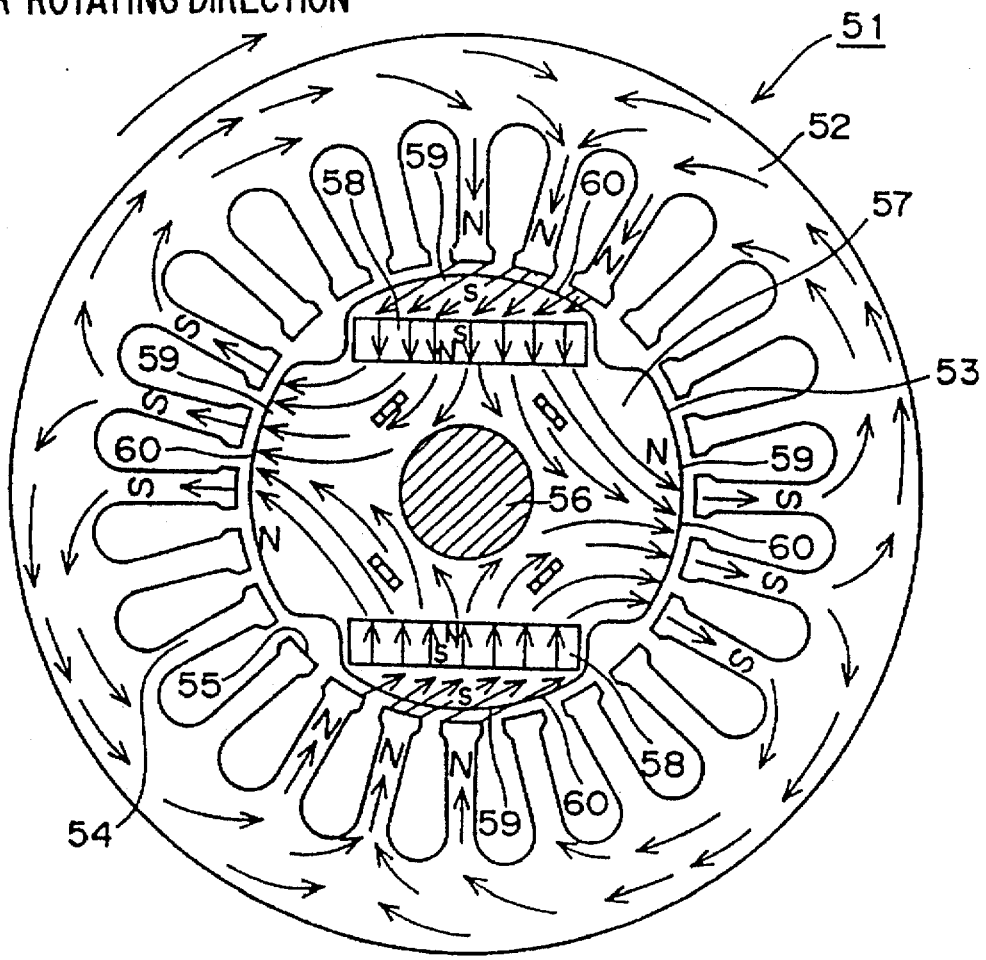
FIG. 35 is a sectional view showing a conventional permanent magnet rotor and stator.
Figure 36:
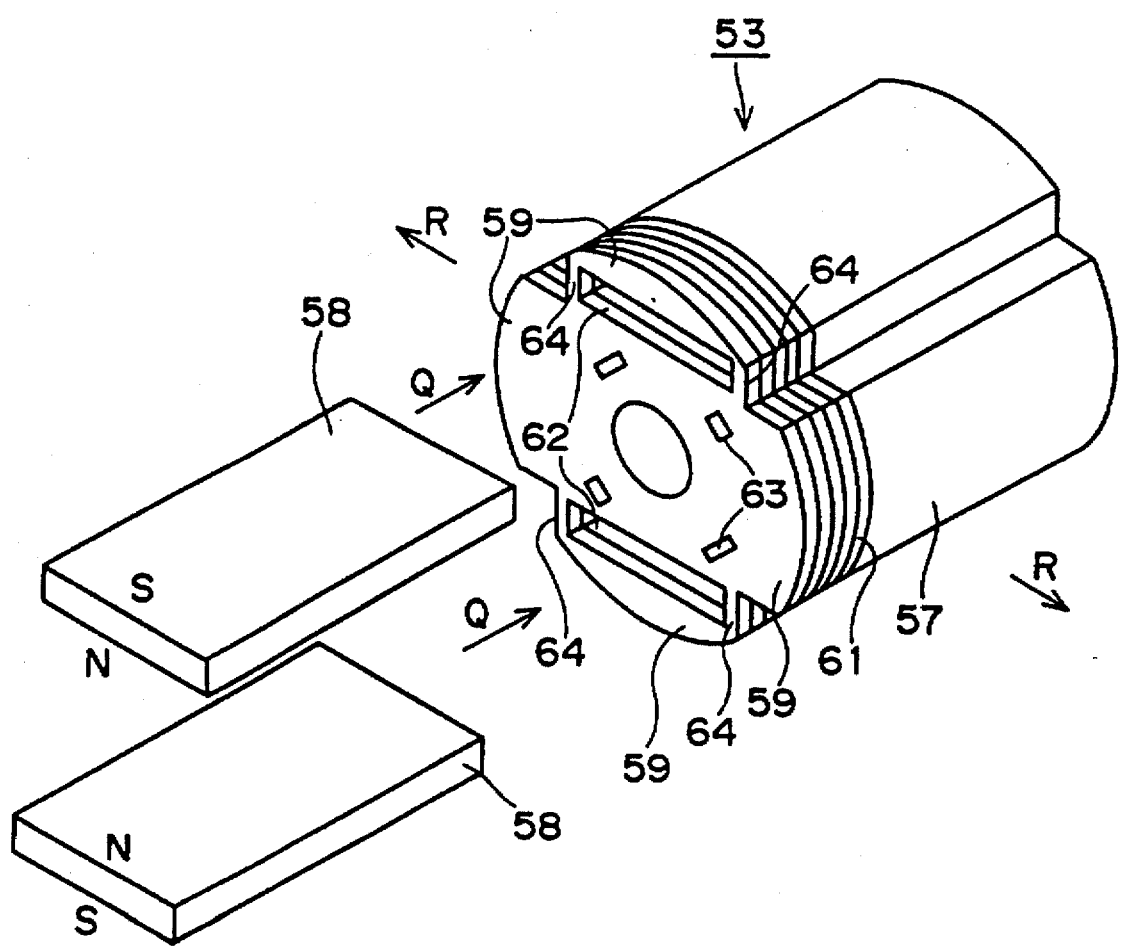
FIG. 36 is a perspective view showing a conventional magnet rotor in an exploded state.
Figure 37:
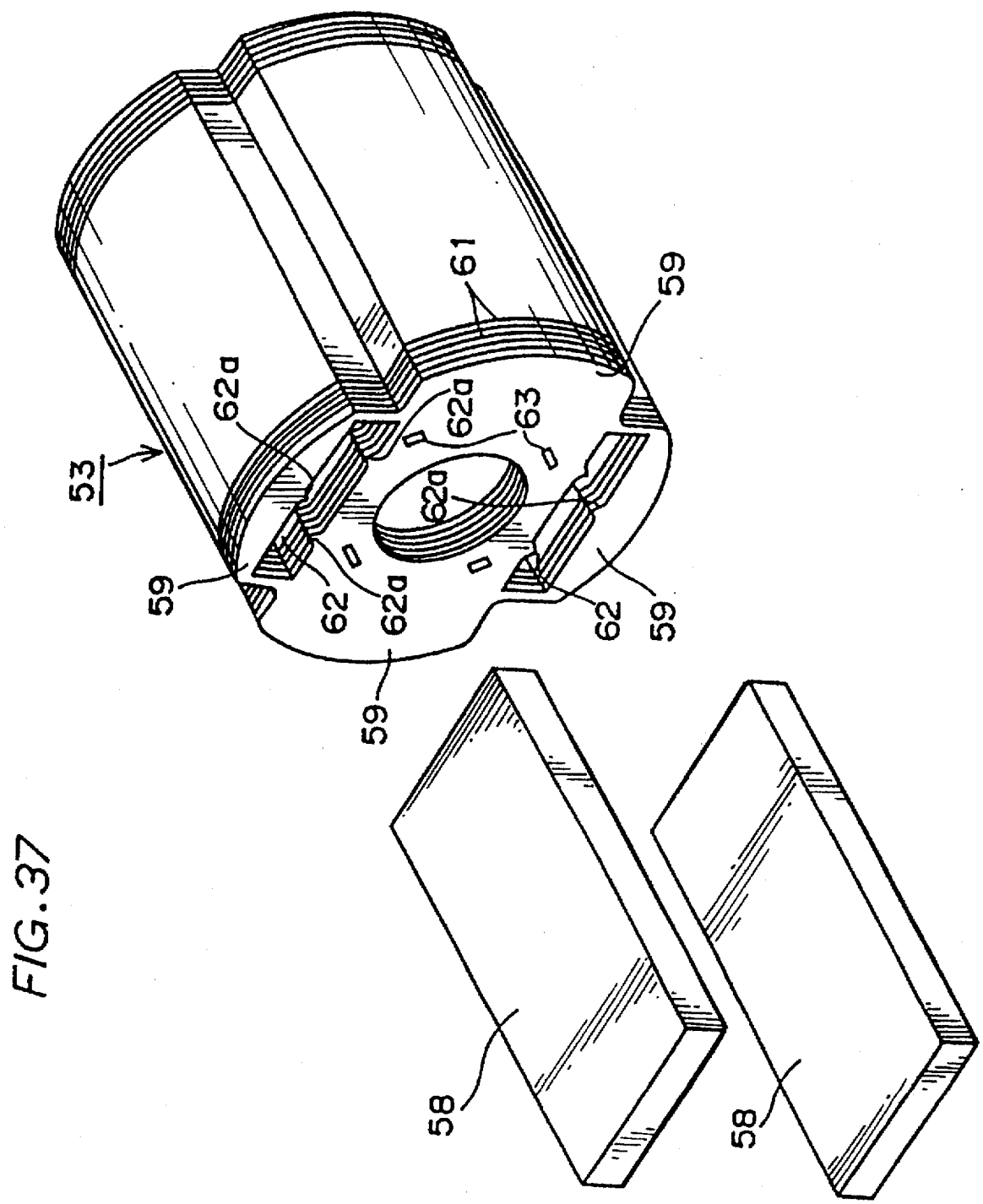
FIG. 37 is a perspective view showing a conventional magnet rotor in an exploded state.

On the other hand, when the cutoff 29 is disposed, substantially an equal quantity of magnetic fluxes enters stator magnetic poles 203, 204 and 205, the magnetic fluxes do not bend extremely at the rotor magnetic poles, saturation is not much at the magnetic poles, each stator magnetic pole has the same torque, and the rotor rotates without many changes or vibrations. FIG. 34 is a diagram showing a relation between the permanent magnet rotor and the stator of a three-phase, four-pole motor (24 poles), where A is an interval between the ends of two stator magnetic poles (2 poles), and a width of the cutoff 29 corresponds to the above interval. In other words, the angle A is a cutoff angle. In FIG. 34, a gap G at a non-cutoff part is 0.5 mm, a maximum gap B at the cutoff part is 1.3 mm, an angle of the maximum gap B from the rotor center is 25°, and an angle of the cutoff end part from the rotor center is 34°. The above values are same in the cases of 12 poles and 36 poles of a three-phase, four-pole motor. In the cases of 18 poles and 36 poles of a three-phase, six-pole motor, the cutoff angle A is 16.7°, and an angle of the cutoff end part from the rotor center is 22.7°.

Industrial Applicability

This invention is suitable for a rotor of a brushless motor used for compact disc players, various types of acoustic equipment, OA equipment and others which need accurate rotation and durability.

We claim:

1. A brushless motor comprising:
   a stator and
   a rotor rotatably supported within the stator, said rotor comprising:
      a yoke which is formed by laminating many steel sheets so as to provide an even number of magnetic poles projected externally and slots provided in each of or every other said magnetic poles,
      a permanent magnet for a field inserted in each of said slots and having top, bottom, front, rear, and side faces, and
      protuberances provided on opposite sides of said slots and brought into contact with the side faces of said permanent magnet for the field forming spaces on opposite sides of said slots.

2. A brushless motor comprising:
   a stator and
   a rotor rotatably supported within the stator, said rotor comprising:
      a yoke which is formed by laminating many steel sheets so as to provide an even number of magnetic poles projected externally and slots provided in each of or every other said magnetic poles, and
      a permanent magnet for a field inserted in each of said slots and having top, bottom, front, rear, and side faces,
   protuberances provided on opposite sides of said slots so as to come into contact with the side faces of said permanent magnet for the field, and
   notches disposed on bases of said protuberances.

3. A brushless motor comprising:
   a stator and
   a rotor rotatably supported within the stator, said rotor comprising:
      a yoke which is formed by laminating many steel sheets so as to provide an even number of magnetic poles projected externally and having bases and leading ends, and slots in each or every other said magnetic poles, and
      a permanent magnet for a field inserted in each of said slots,
   bridges connecting said leading ends and said bases of the each or every other magnetic poles at opposite sides of said slots, and
   spaces defined between said bridges and said permanent magnet for the field inserted in said slot.

4. A brushless motor comprising:
   a stator,
   a rotor rotatably supported within the stator, and
   a rotatable shaft for rotatably supporting said rotor within the stator, said rotor comprising:
      a yoke which is formed by laminating many steel sheets so as to provide an even number of magnetic poles projected externally, and
      a permanent magnet for a field inserted in each magnetic pole or every other magnetic poles,
   caulking sections provided on said steel sheets at angular intervals around the shaft for press-fitting the steel sheets mutually and
   gaps provided in said steel sheets at a predetermined angular distance from an adjacent caulking section for engaging with the projections of the caulking sections by turning at least one end steel sheet,
   said angular intervals being set to be irregular at least at one place around the rotatable shaft.

5. A brushless motor comprising:
   a stator
   a rotor rotatably supported within the stator, and
   a rotatable shaft for rotatably supporting said rotor within said stator, said rotor comprising:
      a yoke which is formed by laminating many steel sheets so as to provide an even number of magnetic poles projected externally, and
      a permanent magnet for a field inserted in each magnetic pole or every other magnetic poles,
   p caulking sections provided on said steel sheets at angular intervals m around said rotatable shaft for press-fitting the steel sheets mutually, with p and m being determined to be p×m≠360°.

6. A brushless motor comprising:

a stator, a rotor rotatably supported within the stator, and a rotatable shaft for rotatably supporting said rotor within said stator, said rotor comprising:

a yoke which is formed by laminating many steel sheets so as to provide an even number of magnetic poles projected externally, and a permanent magnet for a field inserted in each magnetic pole or every other magnetic poles, p caulking sections provided on said steel sheets for press-fitting the steel sheets mutually and gaps provided in said steel sheets at angular intervals m from adjacent caulking sections for press-fitting with the caulking sections by turning at least one end steel sheet, with p and m being determined to be p×m≠360°.

7. A brushless motor comprising:

a stator and a rotor rotatably supported within the stator, said rotor comprising:

a yoke which is formed by laminating many steel sheets so as to provide two split yoke sections having an even number of magnetic poles projected externally, and a permanent magnet for a field inserted in each magnetic pole or every other magnetic poles, formed as one body and held at its both ends by said two split yoke sections whose one end is closed so as to prevent said permanent magnet from being separated from said rotor.

8. A brushless motor comprising:

a stator and a rotor rotatably supported within the stator and having outer periphery, said rotor comprising:

a yoke which is formed by laminating many steel sheets so as to provide an even number of magnetic poles projected externally, and a permanent magnet for a field inserted in each magnetic pole or every other magnetic poles, a cut off face provided on said outer periphery in such a shape that a gap magnetic flux density passing between the cutoff face and a magnetic pole of the stator is uniform on the cutoff face thereby providing uniform rotation.

* * * * *